(12) United States Patent
Terleski et al.

(10) Patent No.: US 9,923,899 B2
(45) Date of Patent: *Mar. 20, 2018

(54) CONTENT ACCESS CONTROL IN A SOCIAL NETWORK

(71) Applicant: GOOGLE INC., Mountain View, CA (US)

(72) Inventors: Jonathan W. Terleski, Mountain View, CA (US); Darren Lee Delaye, San Francisco, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/977,352

(22) Filed: Dec. 21, 2015

(65) Prior Publication Data

US 2016/0112428 A1 Apr. 21, 2016

Related U.S. Application Data

(63) Continuation of application No. 14/811,693, filed on Jul. 28, 2015, now Pat. No. 9,253,196, which is a
(Continued)

(51) Int. Cl.
*H04L 29/06* (2006.01)
*H04L 12/58* (2006.01)
(Continued)

(52) U.S. Cl.
CPC .......... *H04L 63/101* (2013.01); *G06F 3/0481* (2013.01); *G06F 21/6245* (2013.01);
(Continued)

(58) Field of Classification Search
CPC .................................................. H04L 63/101
See application file for complete search history.

(56) References Cited

U.S. PATENT DOCUMENTS 6,566,876 B2   5/2003  Morris et al.
7,467,212 B2 * 12/2008  Adams .................... G06F 9/468
                                                       709/206
(Continued)

FOREIGN PATENT DOCUMENTS

CN    1744557 A    3/2006
CN  101779199 A    7/2010
EP    2249261 A1  11/2010

OTHER PUBLICATIONS

Google Inc., International Preliminary Report on Patentability, PCT/US2012/023004, dated Mar. 1, 2016, 6 pgs.
(Continued)

*Primary Examiner* — Jimmy H Tran
(74) *Attorney, Agent, or Firm* — Morgan, Lewis & Bockius LLP

(57) ABSTRACT

Disclosed are systems and methods associated with a social network application. A plurality of posts associated with a client system user is displayed. First and second posts in the plurality of posts are respectively associated with first and second recipient groups. While the posts are displayed, a content item area is displayed. An input, comprising a content item, is received from the user in the content item area. An affordance is presented that enables the user to designate access control information corresponding distribution entities. The content item and the access control information are transmitted to a system whereupon access to the content item is restricted in accordance with the access control information.

20 Claims, 23 Drawing Sheets

Related U.S. Application Data continuation of application No. 13/360,279, filed on Jan. 27, 2012, now Pat. No. 9,123,080.

(60) Provisional application No. 61/436,951, filed on Jan. 27, 2011.

(51) Int. Cl.

| | | |
|---|---|---|
| *G06F 3/0481* | (2013.01) | |
| *G06Q 50/00* | (2012.01) | |
| *G06F 21/62* | (2013.01) | |
| *G06Q 10/10* | (2012.01) | |

(52) U.S. Cl.
CPC ............ *G06Q 10/10* (2013.01); *G06Q 50/01* (2013.01); *H04L 51/046* (2013.01); *H04L 51/32* (2013.01); *H04L 65/403* (2013.01); *G06F 2221/2111* (2013.01); *G06F 2221/2141* (2013.01)

(56) References Cited

U.S. PATENT DOCUMENTS

| | | | |
|---|---|---|---|
| 7,599,935 B2 | 10/2009 | La Rotonda et al. | |
| 7,886,024 B2 | 2/2011 | Kelly et al. | |
| 8,166,069 B2 | 2/2012 | Sample et al. | |
| 8,556,876 B2 | 10/2013 | Molander et al. | |
| 8,584,258 B2 | 11/2013 | La Rotonda et al. | |
| 8,676,891 B2 | 3/2014 | Su et al. | |
| 8,676,892 B2 | 3/2014 | Su et al. | |
| 8,856,141 B1 | 10/2014 | Dean et al. | |
| 8,892,666 B1* | 11/2014 | Jackson | H04L 51/32 709/203 |
| 8,943,047 B1* | 1/2015 | Carpio | G06Q 10/06 707/723 |
| 9,746,985 B1* | 8/2017 | Humayun | G06F 17/30672 |
| 2002/0086676 A1 | 7/2002 | Hendrey et al. | |
| 2002/0124053 A1 | 9/2002 | Adams et al. | |
| 2005/0198031 A1 | 9/2005 | Pezaris et al. | |
| 2006/0184578 A1 | 8/2006 | La Rotonda et al. | |
| 2006/0184997 A1 | 8/2006 | La Rotonda et al. | |
| 2006/0230061 A1* | 10/2006 | Sample | G06Q 10/10 |
| 2007/0282887 A1 | 12/2007 | Fischer et al. | |
| 2008/0040673 A1 | 2/2008 | Zuckerberg et al. | |
| 2008/0208983 A1 | 8/2008 | Mizrachi et al. | |
| 2008/0235242 A1 | 9/2008 | Swanburg et al. | |
| 2008/0235592 A1* | 9/2008 | Trauth | G06F 3/0482 715/733 |
| 2009/0144392 A1 | 6/2009 | Wang et al. | |
| 2009/0282144 A1 | 11/2009 | Sherets et al. | |
| 2009/0292814 A1 | 11/2009 | Ting et al. | |
| 2010/0146054 A1 | 6/2010 | Armstrong et al. | |
| 2010/0274858 A1 | 10/2010 | Lindberg et al. | |
| 2010/0280965 A1 | 11/2010 | Vesterinen et al. | |
| 2011/0107382 A1* | 5/2011 | Morris | H04N 7/17318 725/109 |
| 2011/0166904 A1 | 7/2011 | Arrowood et al. | |
| 2011/0197146 A1* | 8/2011 | Goto | G06F 3/0482 715/753 |
| 2011/0258535 A1 | 10/2011 | Adler et al. | |
| 2012/0046071 A1* | 2/2012 | Brandis | G06F 1/1694 455/556.1 |
| 2012/0072848 A1 | 3/2012 | Yonemoto | |
| 2012/0109837 A1 | 5/2012 | Sahagun et al. | |
| 2012/0110088 A1 | 5/2012 | Su et al. | |
| 2012/0110474 A1 | 5/2012 | Chen et al. | |
| 2012/0150831 A1* | 6/2012 | Sun | G06F 17/30867 707/706 |
| 2012/0197896 A1* | 8/2012 | Li | H04L 29/08072 707/740 |
| 2012/0209914 A1 | 8/2012 | Sample et al. | |
| 2012/0324121 A1 | 12/2012 | Carr et al. | |
| 2013/0138644 A1* | 5/2013 | Yahia | G06F 17/3053 707/733 |
| 2013/0139048 A1* | 5/2013 | Dhawan | G06Q 30/0278 715/234 |

OTHER PUBLICATIONS

Google Inc., Notification of First Office Action, CN 201280015224.9, dated Jul. 8, 2016, 13 pgs.
Google Inc., International Search Report and Written Opinion, PCT/US2012/023004, dated Aug. 16, 2012, 8 pgs.
Google Inc., Notice of Acceptance, AU Patent Application 2012211130, dated Nov. 12, 2015, 2 pgs.
Google Inc., Patent Examination Report No. 1, AU 2012211130, dated Dec. 3, 2014, 3 pgs.
Guinard, Sharing Using Social Networks in a Composable Web of Things. Proc. of 1st IEEE International Workshop on the Web of Things (WoT 2010), Mannheim, Germany, 2010, 6 pgs.
Google, Extended EP Search Report, 12704477.4, dated Dec. 13, 2016, 9 pgs.

* cited by examiner

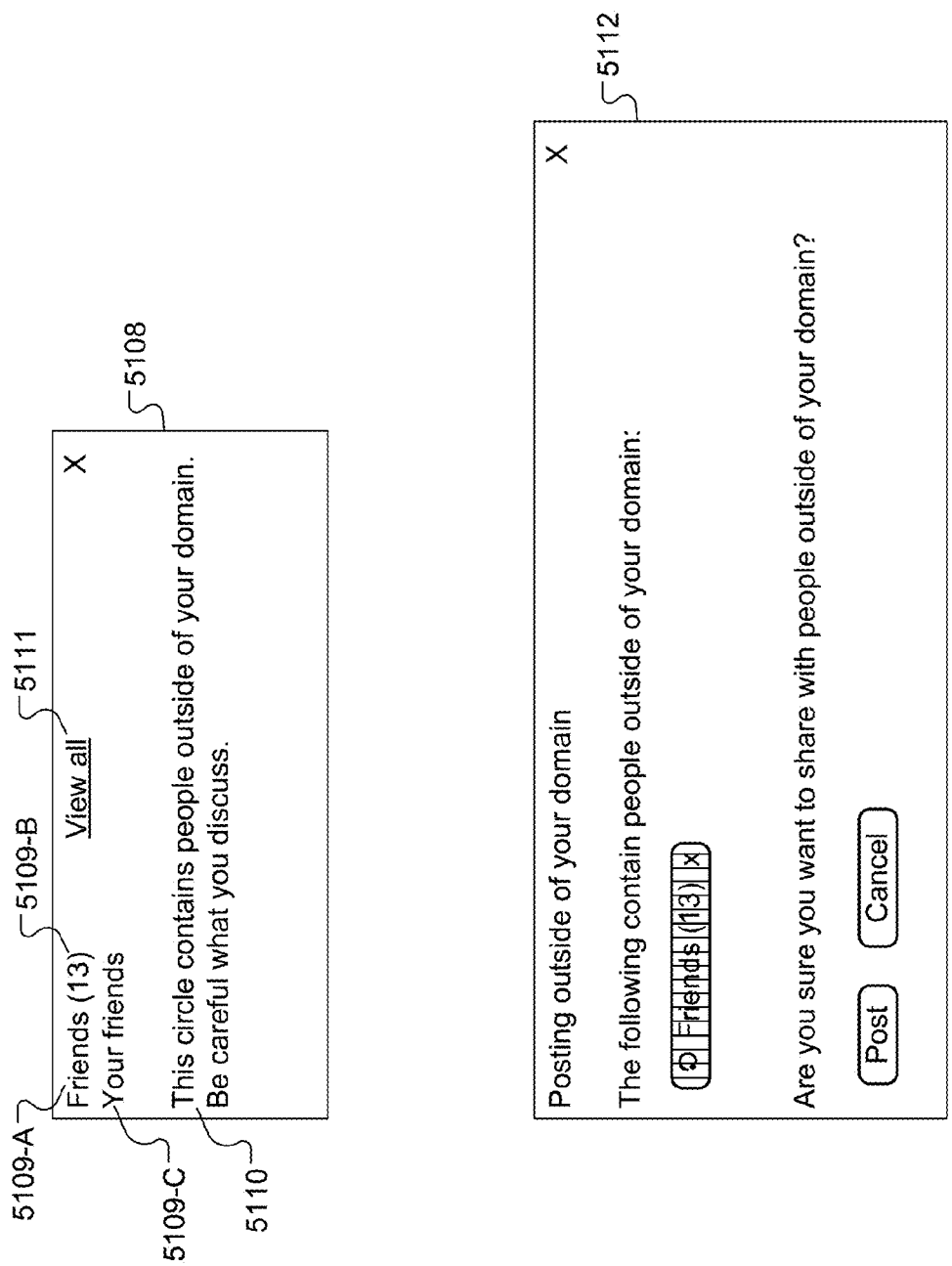

CONTENT ACCESS CONTROL IN A SOCIAL NETWORK

RELATED APPLICATIONS

This application is a continuation of U.S. patent application Ser. No. 14/811,693, entitled "Content Access Control in a Social Network," filed Jul. 28, 2015, which is a continuation of U.S. Pat. No. 9,123,080, entitled "Content Access Control in Social Network," filed Jan. 27, 2012, which claims priority to U.S. Provisional Patent Application No. 61/436,951, entitled "Content Access Control in Social Network," filed Jan. 27, 2011, each of which is hereby incorporated by reference herein in its entirety.

BACKGROUND

The disclosed embodiments relate generally to social networking. More particularly, the disclosed embodiments relate to access control for content in a social network.

Computers and mobile devices, such as mobile phones, have become increasingly interconnected due to the widespread availability of wired and wireless connections to communications networks such as the Internet. This interconnectivity has enabled ways for people to communicate with people far and near and to maintain social and professional bonds.

A popular means of communication that takes advantage of the interconnectivity are web-based social network applications. In such social network applications, a user can post a variety of comments, from short messages or comments about his status or activities or just about anything, to photos and videos and articles of interest. Users can find other users that they know or with whom they share interests and become followers of each others' postings. As such, social network applications offer their users opportunities to communicate and connect with each other through their social bonds and/or common interests. At the same time, a user in a social network may have different social circles and wish to keep the social circles separate. Content posted by the user for one social network circle may be irrelevant to or inappropriate for access by another social network circle.

SUMMARY

In accordance with some embodiments, a method is performed at a client system. The method includes concurrently displaying a content item area and access control list (ACL) information corresponding to an access control list of distribution entities; receiving, from a user of the client system, input in the content item area, the input including a content item; presenting to the client system user an affordance that enables the client system user to update the access control list to produce an updated access control list including one or more distribution entities, at least one distribution entity of the one or more distribution entities corresponding to one or more recipient entities; and transmitting the content item and access control list to a server system for storing the content item in conjunction with the access control list. The server system enables access to the content item to one or more recipient entities in accordance with the access control list.

These and other embodiments can include one or more of the following features. In the method, a respective recipient entity may be an individual user. The method may include receiving, from the client system user, input updating the access control list to produce an updated access control list, and prior to receiving the input updating the access control list, the access control list may be empty. The method may include receiving, from the client system user, input updating the access control list to produce an updated access control list, and prior to receiving the input updating the access control list, the access control list may be an initial access control list that includes one or more distribution entities. The one or more distribution entities included in the initial access control list may includes one or more distribution entities in an access control list associated with a most recent prior content item input by the client system user.

In the method, a respective distribution entity corresponding to the displayed access control list information may be represented by a displayed graphical object. The method may include distributing the content item to one or more of the recipient entities to whom access has been enabled. Optionally, a respective distribution entity may be a social network circle of one or more recipient entities, the client system user may be a member of a social network, the one or more recipient entities in the social network circle may include an individual user who is not a member of the social network, and distributing the content may include sending an email message to the individual user who is not a member of the social network, the email message including the content item or a location of the content item.

Optionally, a respective distribution entity is a single recipient entity, the client system user is a member of a social network, the single recipient entity is an individual user who is not a member of the social network, and distributing the content item includes sending an email message to the individual user who is not a member of the social network, the email message including the content item or a location of the content item.

Optionally, the client system user is a member of a social network, and a respective distribution entity is a social network circle of one or more recipient entities. Further, the one or more recipient entities in the social network circle may include an individual user who is a member of the social network. Optionally, the one or more recipient entities in the social network circle may include an individual user who is not a member of the social network. Optionally, the respective distribution entity is a set of one or more social network circles, each social network circle having one or more recipient entities. Optionally, a respective distribution entity includes one or more recipient entities associated with the client system user and one or more recipient entities associated with a respective recipient entity associated with the client system user. Optionally, a respective distribution entity is a domain, the domain including one or more recipient entities. Optionally, a respective distribution entity is a single recipient entity, the single recipient entity being an individual user. Further, the client system user and the individual user may both be members of a social network. Alternatively, the client system user may be a member of a social network, while the individual user is not a member of the social network.

Optionally, a respective distribution entity is a content feed associated with the client system user. The method may further include receiving from the client system user input providing credentials to access the content feed.

Optionally, a respective distribution entity includes one or more recipient entities associated with a specified geographical region. Optionally, a respective distribution entity includes one or more recipient entities associated with a specified institution.

In accordance with some embodiments, a client system includes one or more processors, memory, and one or more programs; the one or more programs are stored in the memory and configured to be executed by the one or more processors and the one or more programs include instructions for performing the operations of the method described above. In accordance with some embodiments, a non-transitory computer readable storage medium has stored therein one or more programs including instructions which, when executed by a client system, cause the client system to perform the operations of the method described above. These and other embodiments can include one or more of the additional features listed above.

BRIEF DESCRIPTION OF THE DRAWINGS

Like reference numerals refer to corresponding parts throughout the drawings.

DETAILED DESCRIPTION

Reference will now be made in detail to embodiments, examples of which are illustrated in the accompanying drawings. In the following detailed description, numerous specific details are set forth. However, it will be apparent to one of ordinary skill in the art that the various embodiments may be practiced without many of these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact. The first contact and the second contact are both contacts, but they are not the same contact.

The terminology used in the description herein is for the purpose of describing particular embodiments only and is not intended to be limiting of the claims. As used in the description of the embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

Figure 1:
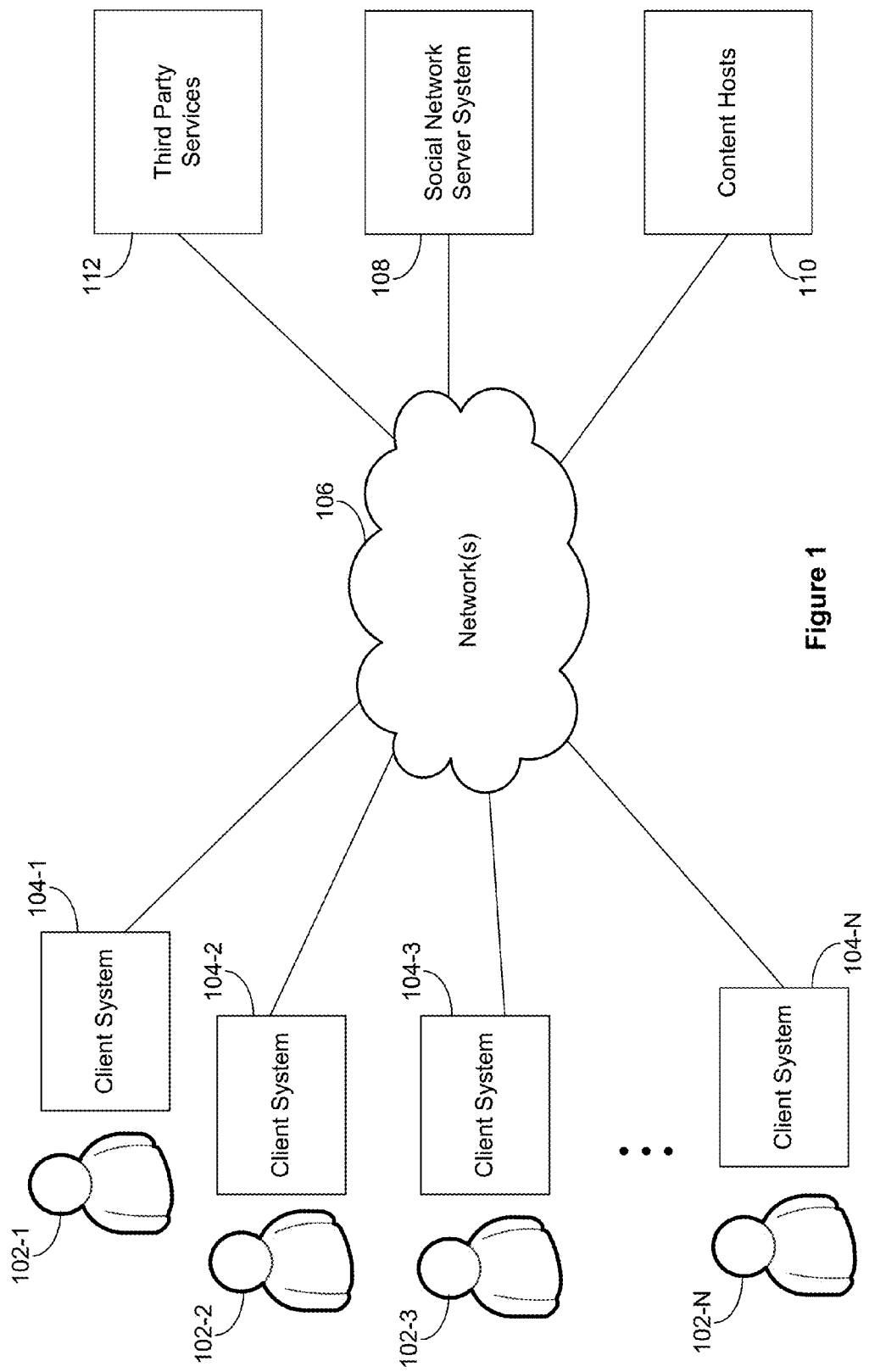
FIG. 1 is a block diagram of a network architecture of a social network in accordance with some embodiments.

FIG. 1 is a block diagram of a network architecture 100 of a social network in accordance with some embodiments. The network architecture 100 includes a number of client systems (also called "client devices," "client computers," or "clients") 104-1, 104-2 . . . 104-N communicably connected to a social network server system 108 by one or more networks 106.

In some embodiments, the client devices 104-1, 104-2 . . . 104-N can be computing devices such as laptop or desktop computers, smart phones, personal digital assistants, portable media players, tablet computers, or other appropriate computing devices that can be used to communicate with an electronic social network. In some embodiments, the social network server system 108 can be a single computing device such as a computer server, while in other embodiments, server system 108 is implemented by multiple computing devices working together to perform the actions of a server system (e.g., cloud computing). In some implementations, the network(s) 106 can be a public communication network (e.g., the Internet, cellular data network, dialup modems over a telephone network) or a private communications network (e.g., private LAN, leased lines) or a combination of such communication networks.

Users 102-1 through 102-N of the client devices 104-1 through 104-N access the social network server system 108 to participate in a social networking service. For example, one or more of the client devices 104-1, 104-2 . . . 104-N execute web browser applications that can be used to access the social networking service. In another example, one or more of the client devices 104-1, 104-2 . . . 104-N execute software applications that are specific to the social networking service (e.g., social networking "apps" running on smart phones).

Users interacting with the client devices 104-1, 104-2 . . . 104-N can participate in the social networking service provided by the server system 108 by posting information, such as text comments (e.g., updates, announcements, replies, notes, tweets), digital photos, videos, or other appropriate electronic information. Users of the social networking service can also annotate information posted by other users of the social networking service (e.g., endorsing or "liking" a posting, commenting on a posting). In some embodiments, information can be posted on a user's behalf by systems and/or services external to the social networking service or the server system 108. For example, the user may post a review of a movie to a movie review website, and with proper permissions that website may cross-post the review to the social network on the user's behalf. In another example, a software application executing on a mobile device, with proper permissions, may use global positioning system (GPS) capabilities to determine the user's location and automatically update the social network with his location (e.g., "At Home", "At Work", "In Brownsdale, Minn.").

The information posted by users 102 to the social networking service may include content posted directly into the social networking service (e.g., text comment entered into a text entry field of the social networking service, photos uploaded from client systems 104 to the social network server system 108, etc.). The posted information may also include links to content external to the social networking service or external content embedded into a posting in the social networking service. In some embodiments, the external content is located at content hosts 110. For example, the external content may be articles (or more generally, web pages) hosted outside of the social networking service or online videos hosted by a video sharing site external to the social networking service. In some embodiments, the social network server system 108 may retrieve all or parts of the external content from content host 108 in order to generate information (e.g., article snippet and other information, sample frame of video, video information) to help users identify the external content.

Users interacting with the client devices 104-1, 104-2 . . . 104-N can also use the social network provided by the server system 108 to define social network circles, in order to organize and categorize the user's relationships to other users of the social networking service and to regulate which users in the social networking service and beyond will have access to information posted to the social networking service by the user.

In some embodiments, the social network server system 108 may communicate with one or more third party services 112 through the network 106. Examples of third-party services include other social networking services and microblogging services. The social network server system 108 communicates with a third-party service 112 using one or more application programming interfaces (APIs) corresponding to the third party service 112. For example, the social network server system 108 may communicate with a third-party service 112 to post content to a content feed at the third-party service.

Figure 2:
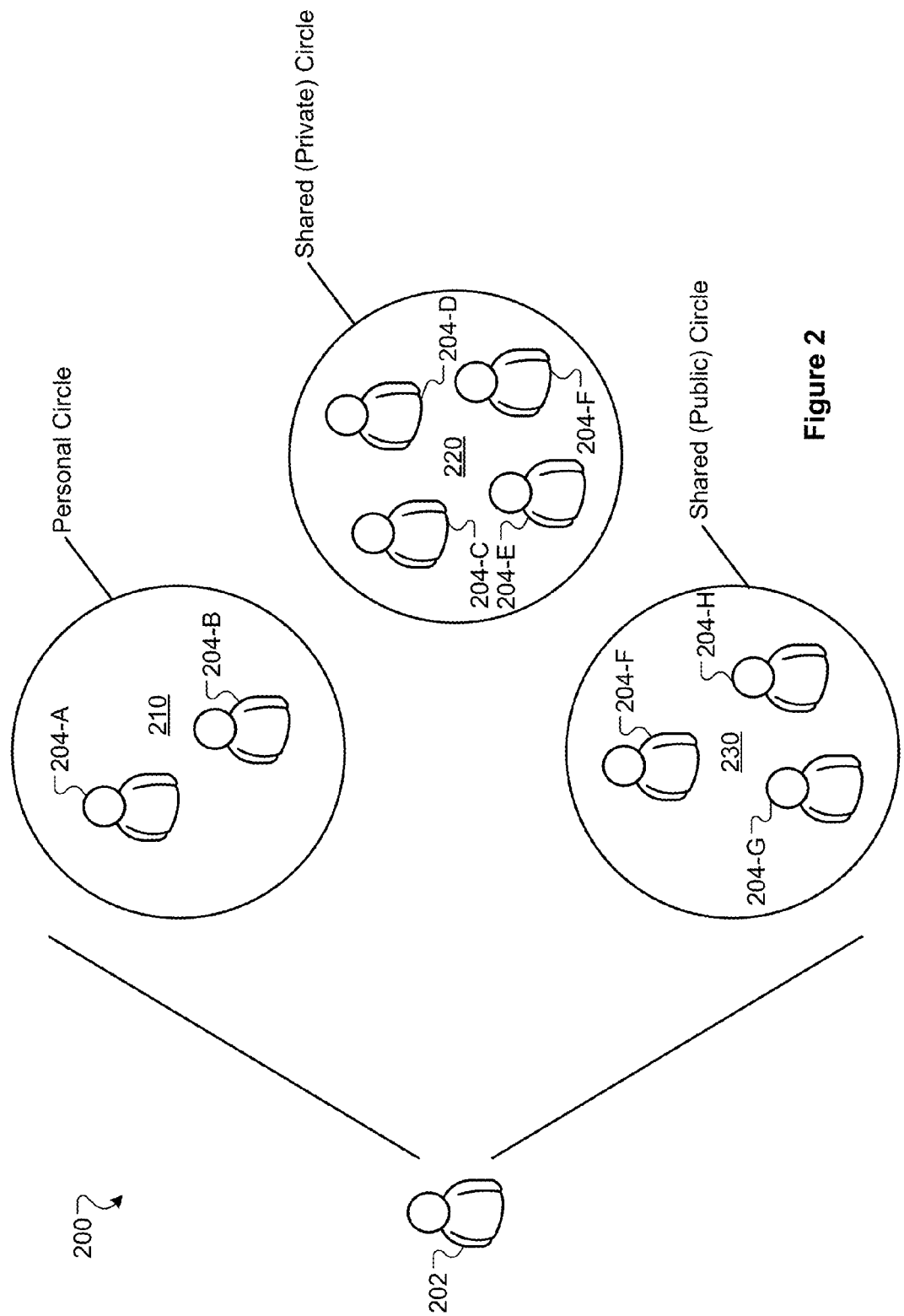
FIG. 2 is a diagram of an example social network including social network circles in accordance with some embodiments.

FIG. 2 is a diagram of an example social network 200 including social network circles (also herein called social circles, or circles, for ease of reference) for a respective user 202, in accordance with some embodiments. User 202 is a member (who may also be referred as a subscriber) of a social networking service that supports the creation and use of social network circles in a social network. In the present example, user 202 has a number of contacts 204-A-204-H (who respectively may or may not be members of the social networking service provided by the social network server system 108) with whom the user 202 has some form of relationship (e.g., friends, coworkers, customers, teammates, clients, relatives, club members, classmates, acquaintances). User 202 may categorize the contacts 204-A-204-H by assigning them to one or more social network circles, such as a social circle 210, a social circle 220, and a social circle 230. User 202 also may leave a contact as an individual contact in the user's social network 200 and not categorize that contact into a social circle.

Social circle 210 is a personal circle. In some embodiments, personal circles are groupings created by and known only to the user 202 (e.g., the contacts 204-A, 204-B receive no indication that they are in the user's 202 private social circle 210). In some embodiments, personal circles are groupings created by the user 202 and known to the user 202 as well as the contacts (e.g., contacts 204-A, 204-B) that are members of the social circle (e.g., the contacts 204-A, 204-B receive an indication that they have been added to the private social circle 210).

In some embodiments, private circles are used to organize and categorize the contacts 204-A-204-H in ways that are relevant to the user 202. In some embodiments, user 202 uses personal circles to organize contacts in order to discretely target which of his contacts 204-A-204-H will see certain postings or have access to particular information. For example, user 202 may be politically active and tend to post items that would be appreciated by some contacts and vigorously opposed by others. As such, the user can organize his contacts into "Left Political Philosophy Friends" and "Right Political Philosophy Friends" personal circles. By doing so, user 202 may better target selected postings to the people who would be most appreciative of such information, or conversely, may prevent contacts (e.g., a subset of contacts 204-A-204-H) who may be offended by such information from seeing such information.

Social circle 220 is a shared private circle, which may also be referred to simply as a shared circle. In general, shared private circles are social circles that user 202 creates and invites, rather than assigns, contacts to voluntarily join. Contacts that accept the invitation become members of the shared private circle. Members of a shared private circle can see information posted to that circle by the user 202 and can post information to be shared with other members of the shared private circle. For example, user 202 may tend to post a large number of jokes to the social network. However, while some of the contacts 204-A-204-H may find the jokes to be entertaining, others may simply find them to be simply annoying. Realizing this, user 202 may create a "jokes" shared private circle and invite some or all of the contacts 204-A-204-H to join. With the "jokes" social circle in place, the user 202 may post witticisms to the "jokes" circle, and only those contacts who have accepted the invitation are able to see user's 202 comicality. Similarly, members of the shared private circle are able to post messages to the social circle, and those posts are visible to other members of that circle.

Social circle 230 is a shared public circle. In general, shared public circles are social circles that the user 202 creates, and invites, rather than assigns, contacts to voluntarily join. Further, the existence of a shared public circle is publicly available such that other members of the social networking service (e.g., not necessarily just the user's 202 contacts 204-A-204-H) may request to join the public social circle. Members of shared public circles may post information to, and see updates posted by, other members of the same public shared circle. In some embodiments, public shares circles include "fan" or "group" circles (e.g., circles dedicated to a particular place, event, product, movie, celebrity, sports team, company, concept, philosophy, organization, support network, etc.). For example, the user 202 may create a shared public circle for his band, and fans of his act may join the social circle to discuss upcoming shows, download MP3s of the band's music, or post videos from recent concerts. In another example, user 202 may create a shared public circle for alumni of his high school graduating class, which his former classmates may find and join in order to stay in touch with one another and post pictures from their school days. Once a shared public circle is created, in some embodiments user 202 can invite people to join the social circle. In some embodiments, nonmembers of the social circle can request membership in the shared public circle, and membership in a shared public circle is automatic upon request, or alternatively membership requires the user's 202 approval.

In some embodiments, one or more default social circles can be provided or suggested to a user when the user subscribes to a social networking service. For example, "Friends," "Family," and "Coworkers" social circles can automatically be provided in a user's profile upon the user subscribing to the particular social networking service. Other social circles can automatically be provided including, for example, an "Acquaintances" social circle and/or a "Just following" social circle. In some embodiments, the automatically created or suggested social circles can include personal social circles. Although default social circles can be automatically provided, it may be left to the user to actually populate the default social circles with contacts. For example, each of the default social circles may initially be empty of contacts, and the user populates each of the default social circles as discussed in further detail herein.

In some embodiments, one or more default social circles can be automatically generated based on the user's profile information. For example, the user's profile may include demographic data (e.g., age), job data and/or interests data (e.g., sports, hobbies). Through data mining techniques (e.g., clustering social circle creations over a threshold number of users), a provider of the social networking service may determine that users within a particular demographic typically create one or more particular types of social circles. By categorizing a user within a particular demographic, the provider of the social networking service can suggest or automatically generate one or more particular default social circles. For example, if a particular user falls within a demographic that corresponds to a high school student, a default "School Friends" social circle is suggested to or automatically created for the user. As another example, if a particular user falls within a demographic that corresponds to a college student, a default "College Friends" social circle is suggested to or automatically created for the user. Social circles can also be suggested or created based on interest data provided in a user's profile. For example, if a particular user's interests include skiing, a default "Ski Buddies" social circle may be suggested to or automatically created for the user.

As discussed herein, posts can be distributed to contacts within (and in some embodiments, also to recipients not within) the social network including one or more social circles, such that they are exclusively viewable by the indicated contacts and/or contacts within one or more indicated social circles. For example, and as discussed in further detail below with regard to FIGS. 5A-5Q, a user of the social networking service can generate a post and indicate one or more social circles, contacts, or groups of contacts for distribution of the post. In some embodiments, an autocomplete component enables the user to type in part of the name of a social circle, contact, and/or group to specify which social circles, contacts, and/or groups require delivery of the post content. During a post write-time, a post data set is transmitted from the user's client computing device (e.g., client system 104 of FIG. 1) to a distribution hub, which can be provided at a server (e.g., social network server system 108 of FIG. 1). The post data set includes a plurality of data. In some embodiments, the post data set includes post content data (e.g., text, uniform resource indicator (URI)), timestamp data (e.g., a timestamp indicating the time that the post was generated), distribution data (e.g., contacts, one or more social circles, etc.), and identification (ID) data (e.g., an ID assigned to the post data set upon generation of the post). In some embodiments, the distribution data is processed to provide an access control list (ACL) that specifies which contacts, social circles, etc. within or without the social networking service are granted access to the post content. In some embodiments, the distribution hub determines end points the post data set is to be distributed to based on the ACL. More specifically, the set of contacts who are allowed access to the post is determined based on the ACL and the ID of the post is written to a per user/view index at the distribution hub. When fetching posts to distribute to a user, the user/view index is accessed and the IDs of the various posts that the user is allowed to view are determined. The post data sets are retrieved from a data store (e.g., a data store (not shown) at the social network server system 108 of FIG. 1) and are transmitted to a client system associated with the requesting user.

The social circles, contacts, groups, etc. that the user includes in the ACL of a post are sometimes herein referred to as distribution entities. Thus, an ACL may include one or more distribution entities. In some embodiments, a distribution entity is a set of one or more social circles or a set of one or more contacts or a set of one o more groups. For example, a distribution entity may be a social circle (e.g., a "friends" circle) or a set of the user's circles (e.g., "my circles"). As another example, a distribution entity may be an individual contact or the user's first and second degree contacts (e.g., the user's "friends" and "friends of friends"). As a further example, a distribution entity may be contacts that list a particular university as an affiliation or everybody in the social networking service. The contacts that are the ultimate distributive targets of a post by virtue of belonging to a distribution entity in the ACL are sometimes herein referred to as recipient entities.

Figure 3:
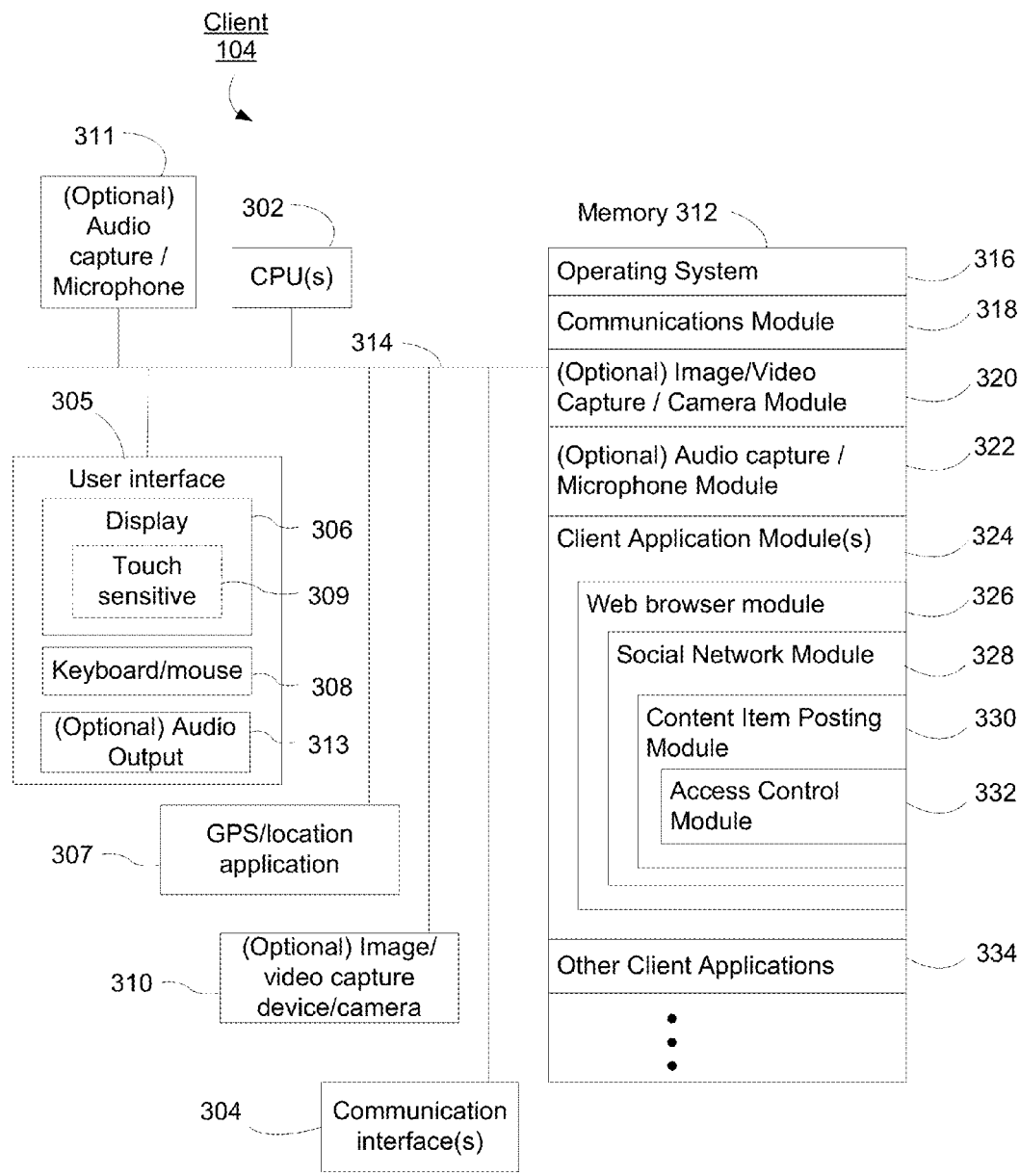
FIG. 3 is a block diagram illustrating a client system in accordance with some embodiments.

FIG. 3 is a block diagram illustrating a client system 104 in accordance with some embodiments. Client system 104 typically includes one or more processing units (processors, sometimes called microprocessors, CPUs or CPU processors) 302, one or more network or other communications interfaces 304, memory 312, and one or more communication buses 314 for interconnecting these components. The communication buses 314 optionally include circuitry (sometimes called a chipset) that interconnects and controls communications between system components. Client system 104 includes a user interface 305. The user interface 305 typically includes a display device 306 and optionally includes an input means such as a keyboard, mouse, or other input buttons 308. Alternatively or in addition the display device 306 includes a touch sensitive surface 309, in which case the display 306/309 is a touch sensitive display. In client systems that have a touch sensitive display 306/309, a physical keyboard is optional (e.g., a soft keyboard may be displayed when keyboard entry is needed). Optionally, the user interface includes an audio output device 313, such as speakers or an audio output connection connected to speakers, earphones, or headphones. Furthermore, some client systems use a microphone and voice recognition to supplement or replace the keyboard. Optionally, the client 104 includes an audio capture device 311 (e.g., a microphone) to capture audio (e.g., speech from a user). Optionally, the client 104 includes a GPS (global positioning satellite) receiver, or other location detection apparatus 307 for determining the location of client system 104. Client system 104 also optionally includes an image/video capture device 310 such as a camera or webcam.

Memory 312 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 312 may optionally include one or more storage devices remotely located from the processor(s) 302. Memory 312, or alternatively the non-volatile memory device(s) within memory 312, comprises a non-transitory computer readable storage medium. In some embodiments, memory 312 or the computer readable storage medium of memory 312 stores the following programs, modules and data structures, or a subset thereof:

- an operating system 316 that includes procedures for handling various basic system services and for performing hardware dependent tasks;
- a network communication module 318 that is used for connecting client system 104 to other computers via the one or more communication network interfaces 304 (wired or wireless) and one or more communication networks, such as the Internet, other wide area networks, local area networks, metropolitan area networks, and so on;
- optionally, a image/video capture module or camera module 320 for processing a respective image or video captured by the image/video capture device/camera 310, where the respective image or video is sent or streamed (e.g., by a client application module) to the social network server system;
- optionally, an audio capture module or microphone module 322 for processing audio captured by the audio capture device/microphone 311, where the respective audio is sent or streamed (e.g., by a client application module) to the social network server system;
- one or more client application modules 324, including a web browser module 326 for executing and rendering a social network module 328 which provides an interface to a social network (e.g., a social network provided by social network server system 108) and related features;
- a content item posting module 330 within the social network module 328 for posting content to the social network, including an access control module 332 for specifying which contacts and social network members and/or circles have access to a posted content item (e.g., by setting access control lists); and
- additional optional client applications 334 such as a digital media playback module or application.

In some embodiments, the social network module 328 is a standalone application separate from the web browser module 326. For example, social network module 328 may be an "app" on a smart phone client device 104. In some embodiments, the social network module 328 includes a web browser sub-module (e.g., for browsing external web pages linked to in a post without opening a separate web browser module).

Figure 4A:
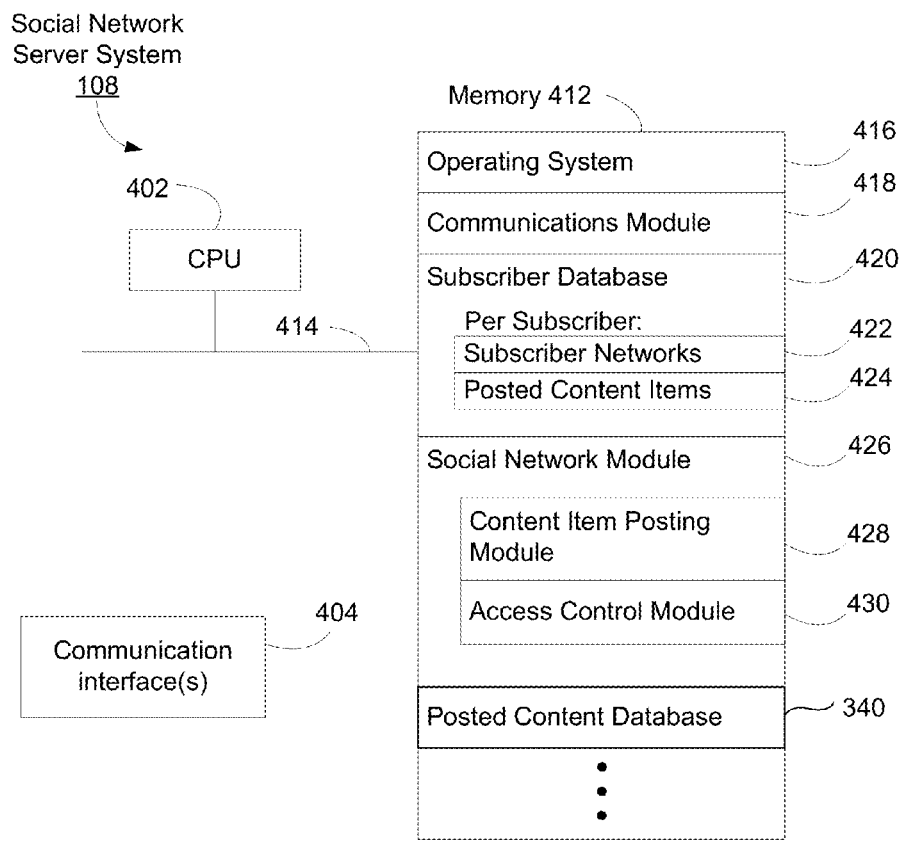
FIG. 4A is a block diagram illustrating a social network server system in accordance with some embodiments.

FIG. 4A is a block diagram illustrating a social network server system 108 in accordance with some embodiments. The social network server system 108 typically includes one or more processing units (processors, sometimes called microprocessors, CPUs or CPU processors) 402, one or more network or other communications interfaces 404, memory 412, and one or more communication buses 414 for interconnecting these components. The communication buses 414 optionally include circuitry (sometimes called a chipset) that interconnects and controls communications between system components.

Memory 412 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 412 may optionally include one or more storage devices remotely located from the processor(s) 402. Memory 412, or alternatively the non-volatile memory device(s) within memory 412, comprises a non-transitory computer readable storage medium. In some embodiments, memory 412 or the computer readable storage medium of memory 412 stores the following programs, modules and data structures, or a subset thereof:

- an operating system 416 that includes procedures for handling various basic system services and for performing hardware dependent tasks;
- a network communication module 418 that is used for connecting the social network server system 108 to other computers via the one or more communication network interfaces 404 (wired or wireless) and one or more communication networks, such as the Internet, other wide area networks, local area networks, metropolitan area networks, and so on;
- a subscriber database 420 for storing data associated with subscribers/members of the social network, including login information, privacy and other preferences, biographical data, and so forth;
- subscriber network information 422 in subscriber database 420 for storing data regarding groups and circles of subscribers in the social network and connections between subscribers;
- posted content items 424, retained for each subscriber; the posted content items include content items, whether they be content uploaded to and stored at the social network server system 108 or links to external content, posted by the subscriber;
- a social network module 426 for providing social networking services and related features, in conjunction with social network module 328 on the client system 104;
- a content item posting module 428 for accepting content items posted using content item posting module 330 on a respective client system 104; and
- access control module 430 for controlling access to posted content items in accordance with access control lists set using access control module 332 on the client system 104.

Figure 4B:
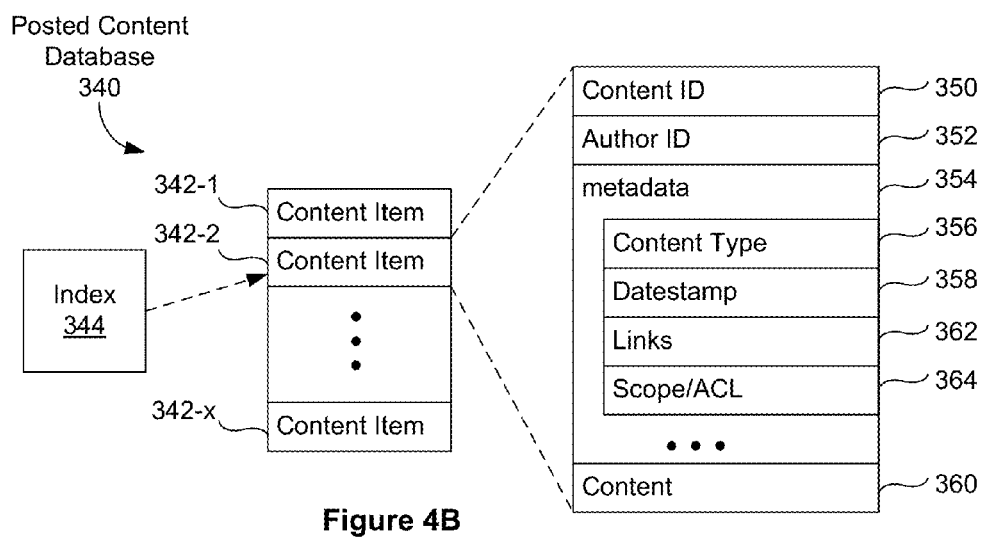
FIG. 4B is a block diagram of a posted content database.

The social network server system 108 typically includes a database 340 for storing and accessing posted content. As shown in FIG. 4B, posted content database 340 includes content items 342, also called posts, and an index 344 for helping to locate items in the database. A respective content item 342 includes a content identifier (content ID) 350, which uniquely identifies the content item, an author identifier (author ID) 352 of the person who posted the content item, metadata 354 representing various characteristics of the content item, and the content 360 of the content item 342. In some embodiments, metadata 354 includes a content type identifier 356, identifying the type of the post (e.g., text, photo, URL, etc.), and a datestamp 358 that identifies when the content item was posted, links 362 to related content items (e.g., a link to an item commented on by this post, links to other content items that comment on this post). In some embodiments, metadata 354 also includes an access control list (ACL) 364, sometimes called the distribution scope. The ACL or distribution scope 364 specifies the range of users allowed to access the content item. Examples of the ACL or distribution scope 364 are "public," indicating that all users of the social network can access the item, and a list of one or more distribution entities (e.g., social network circles, user identifiers, other social groups). In some embodiments, the data structures used to store content items 342 are more complex than shown in FIG. 4B.

Social network module 426 utilizes posted content database 340 to determine what items to include in a content stream 502 (FIG. 5A) of a subscriber.

Figure 5A:
FIGS. 5A-5Q illustrate an social network page with a content item sequence, in accordance with some embodiments.
Figure 5B:
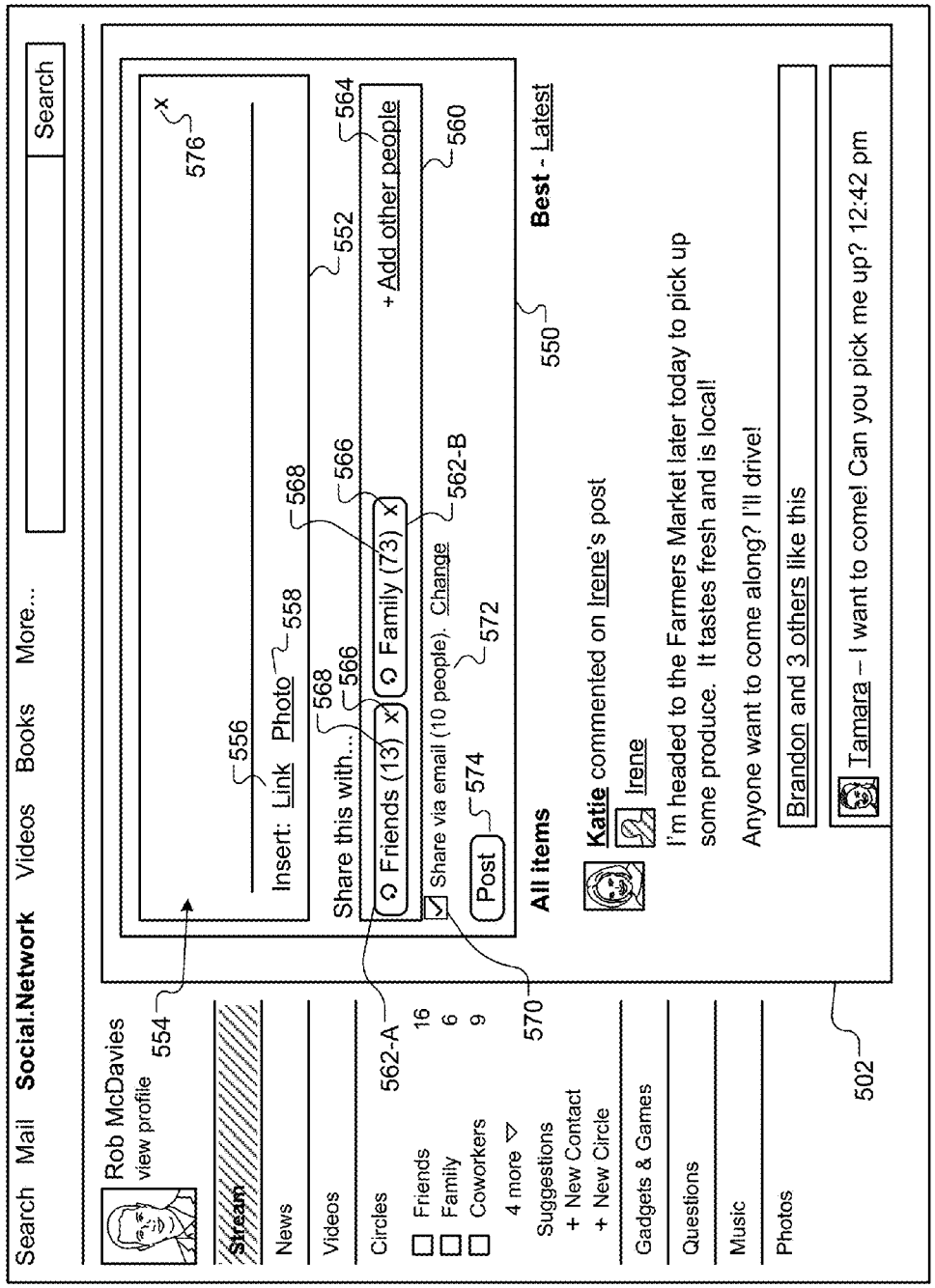
Figure 5C:
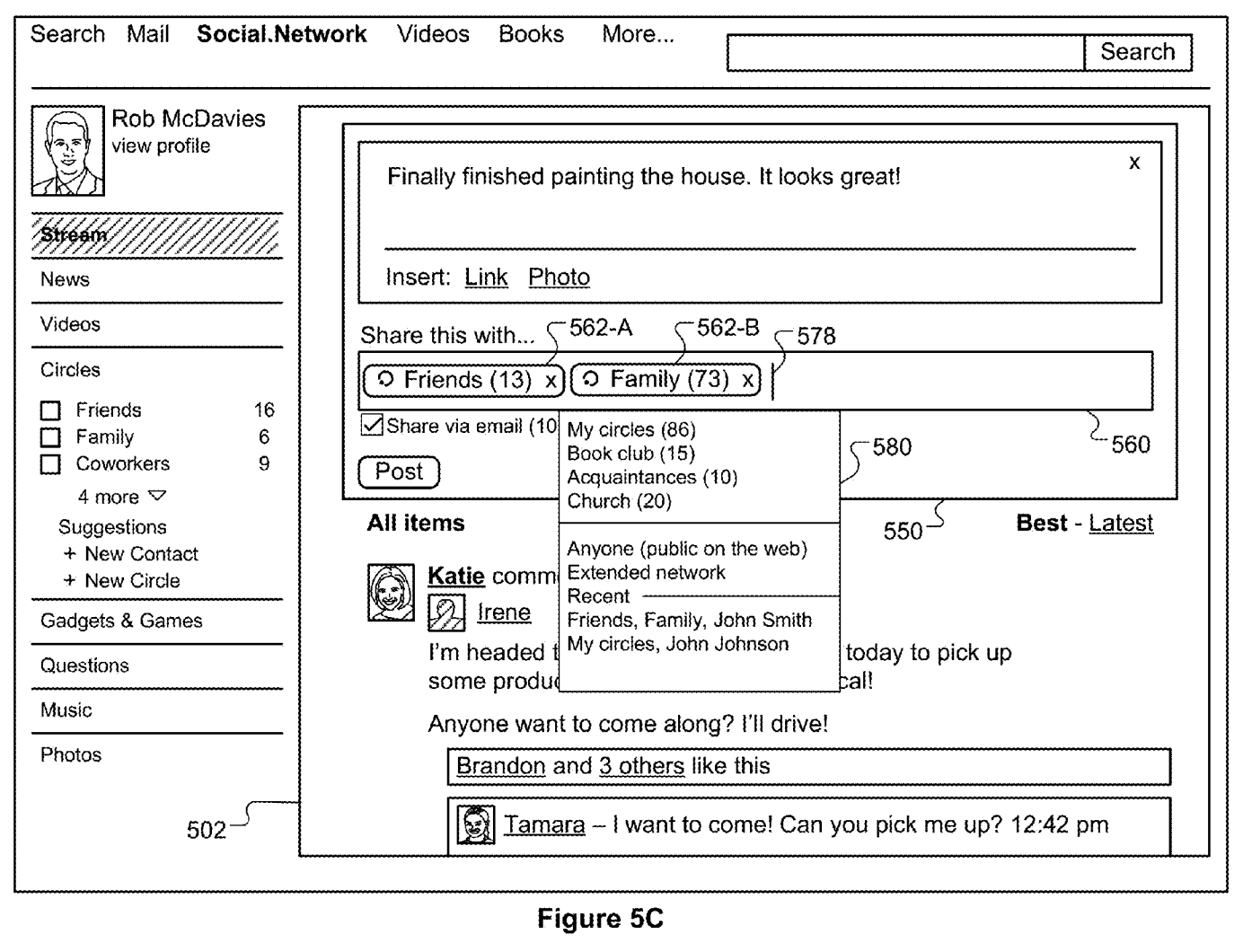
Figure 5D:
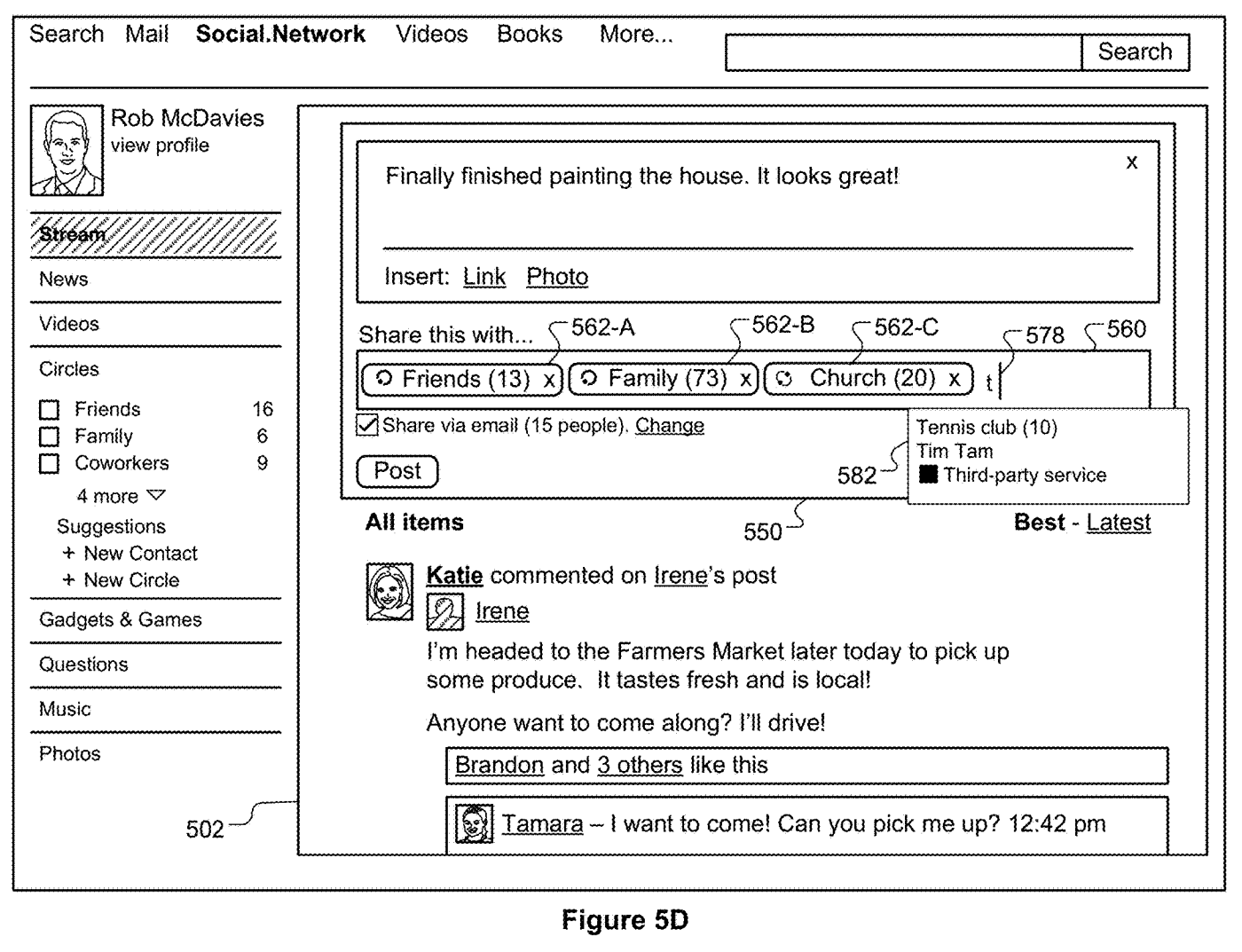
Figure 5E:
Figure 5F:
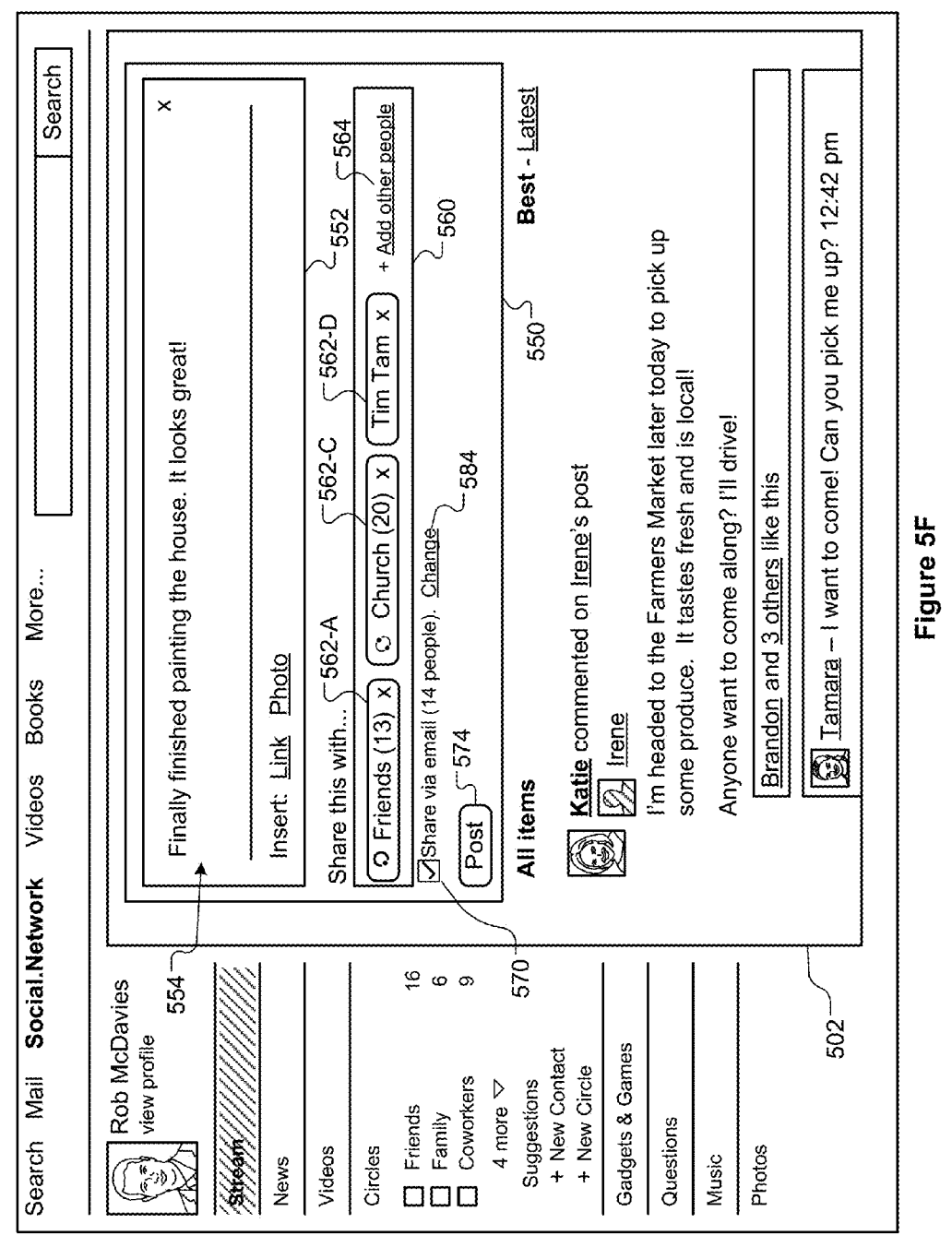
Figure 5G:
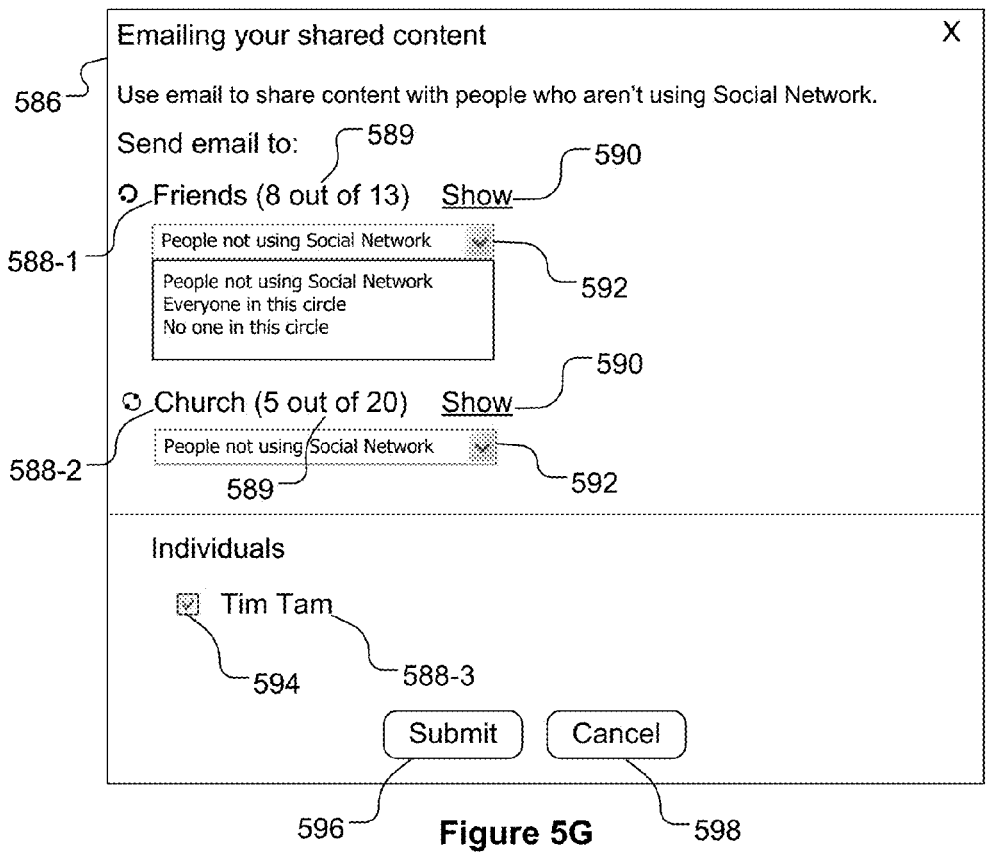
Figure 5L:
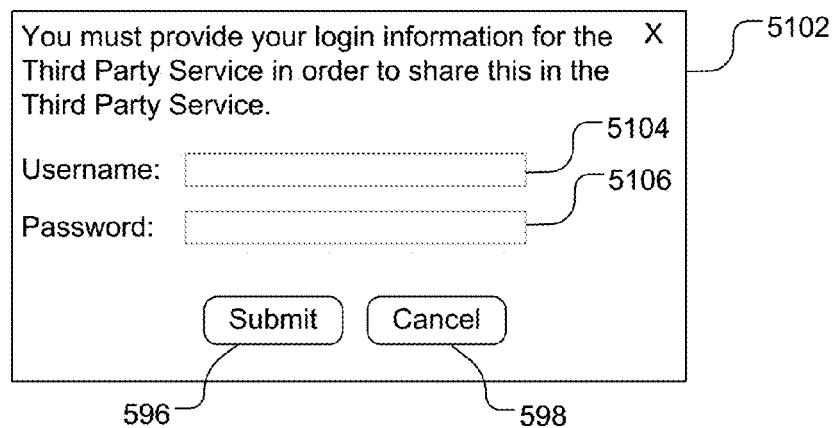
Figure 5H:
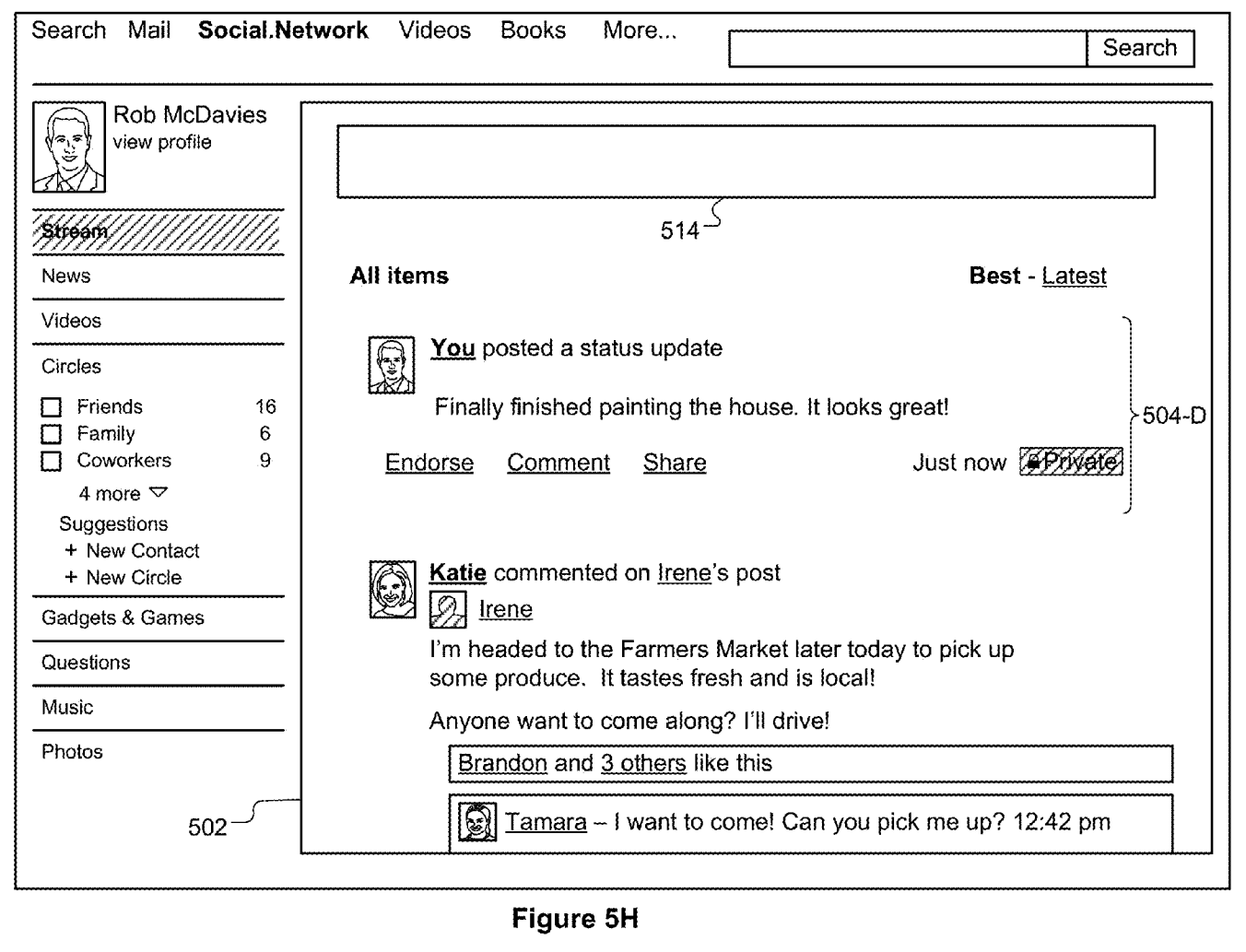
Figure 5I:
Figure 5J:
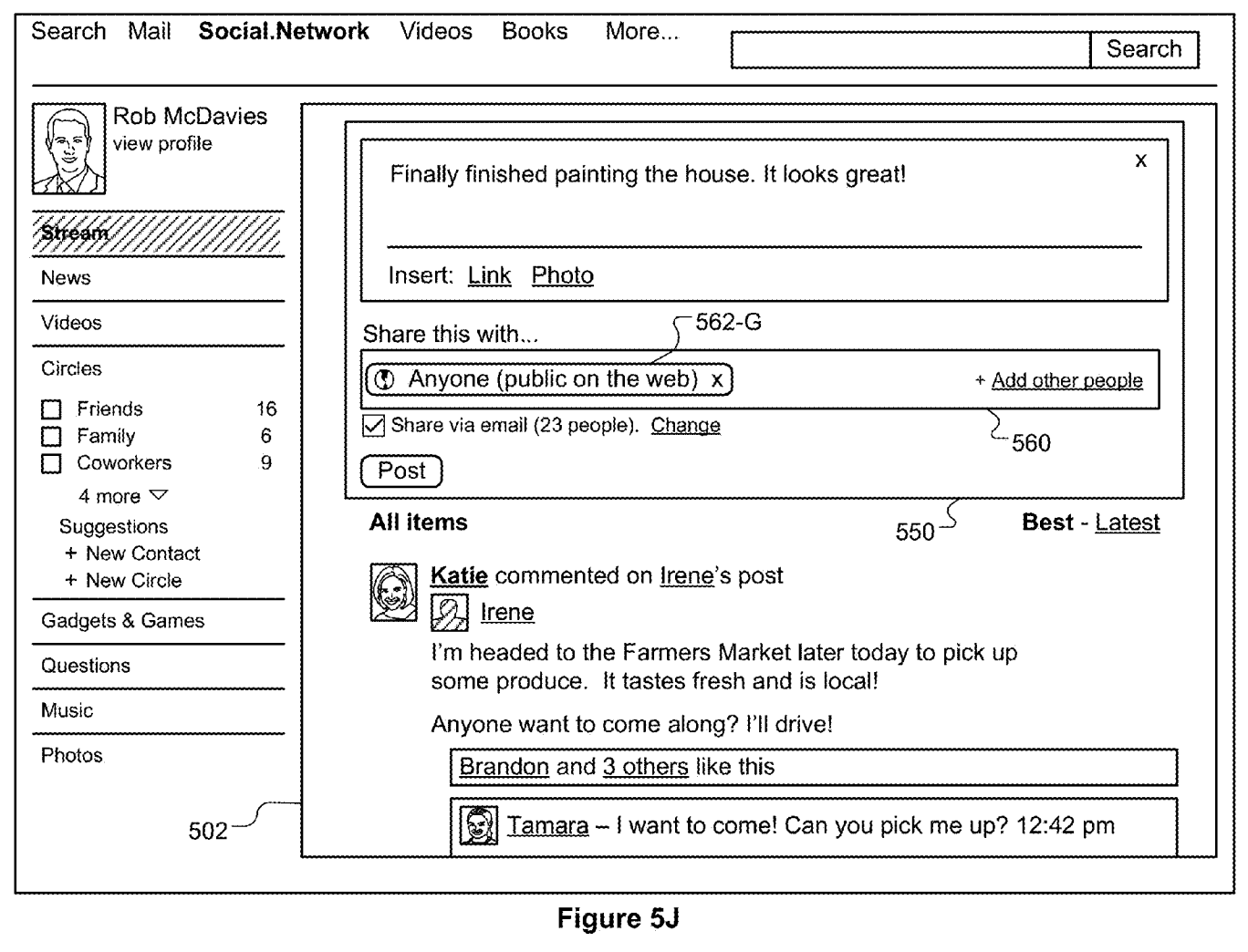
Figure 5K:
Figure 5M:
Figure 5N:
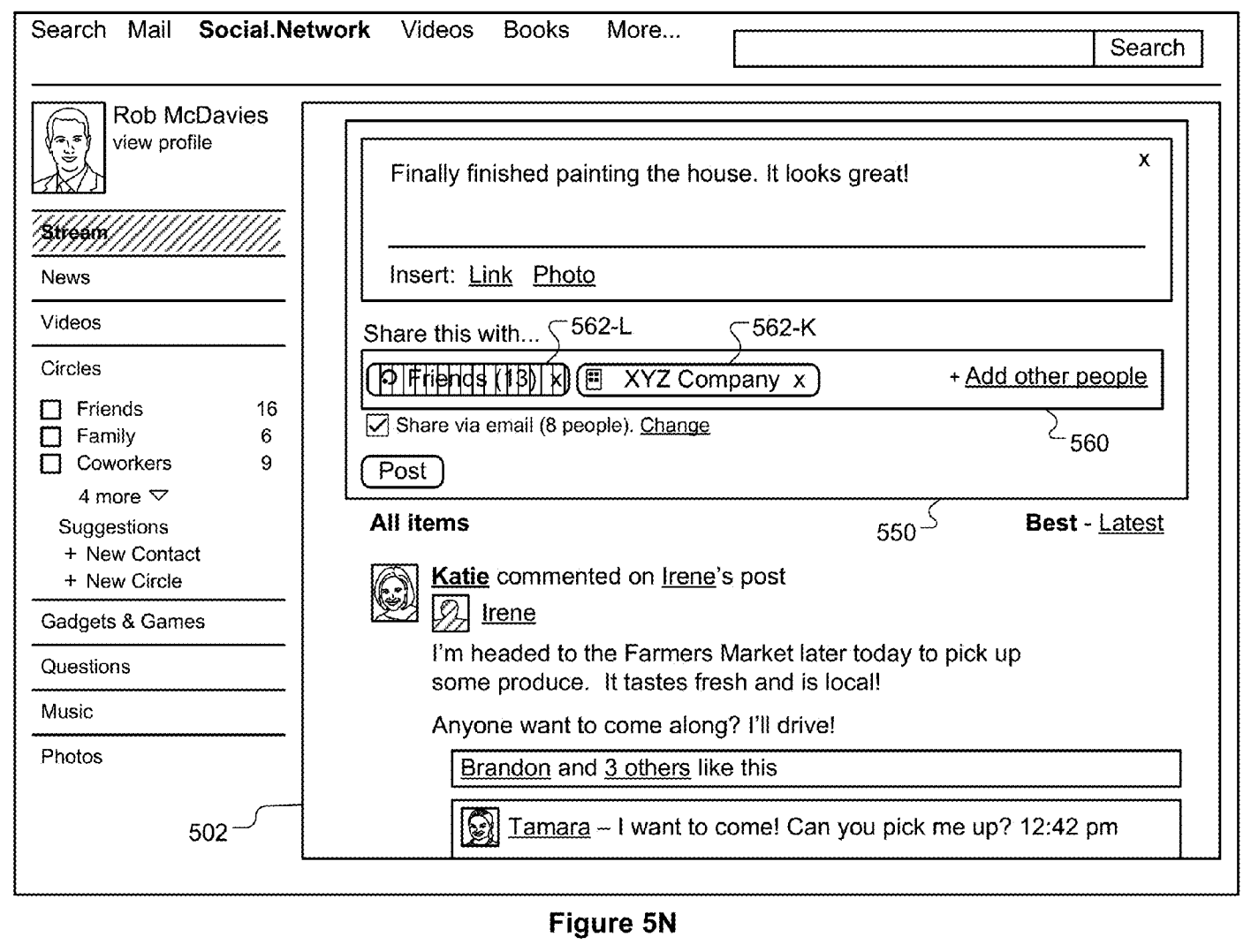
Figure 5P:
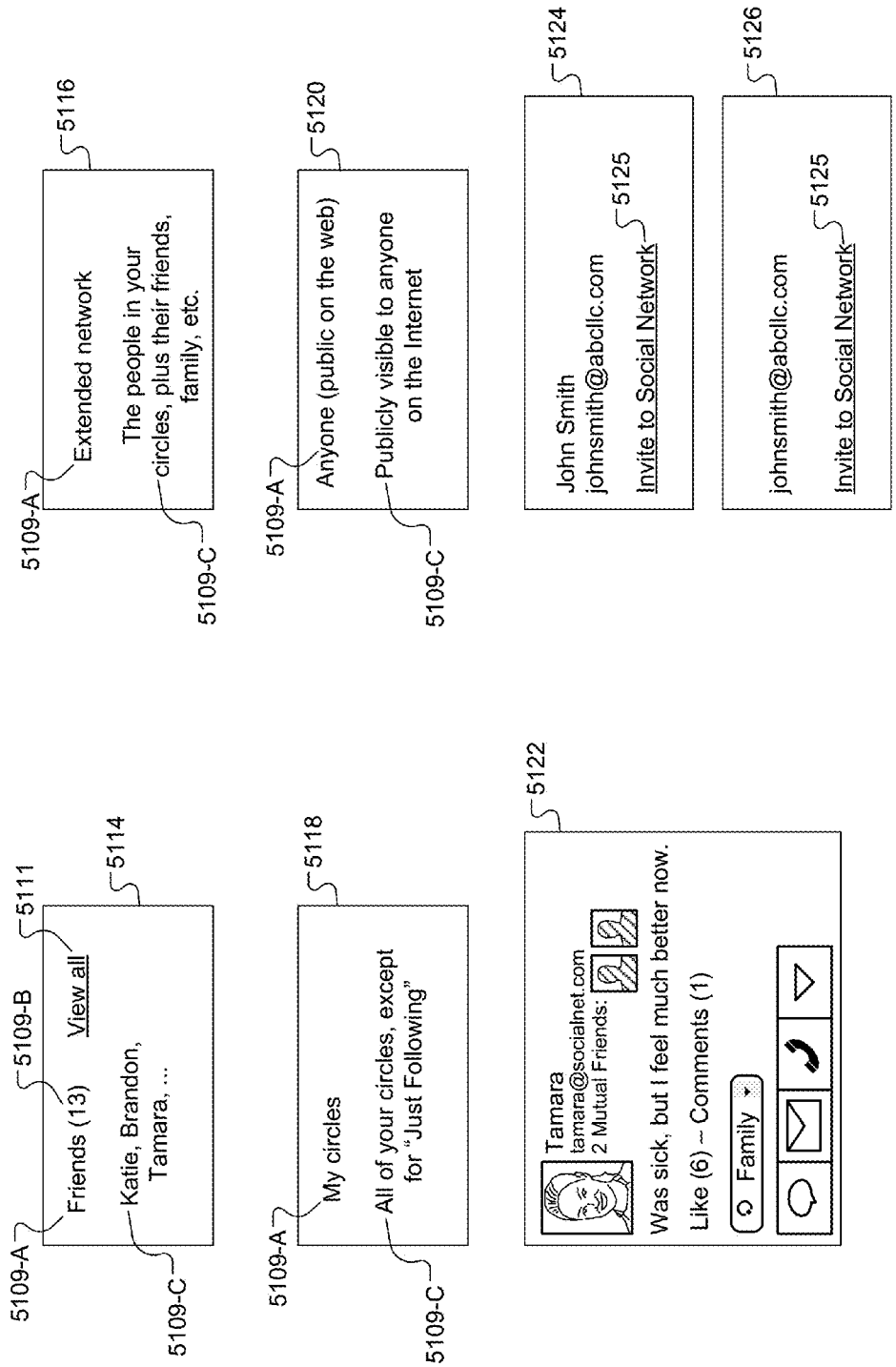
Figure 5Q:
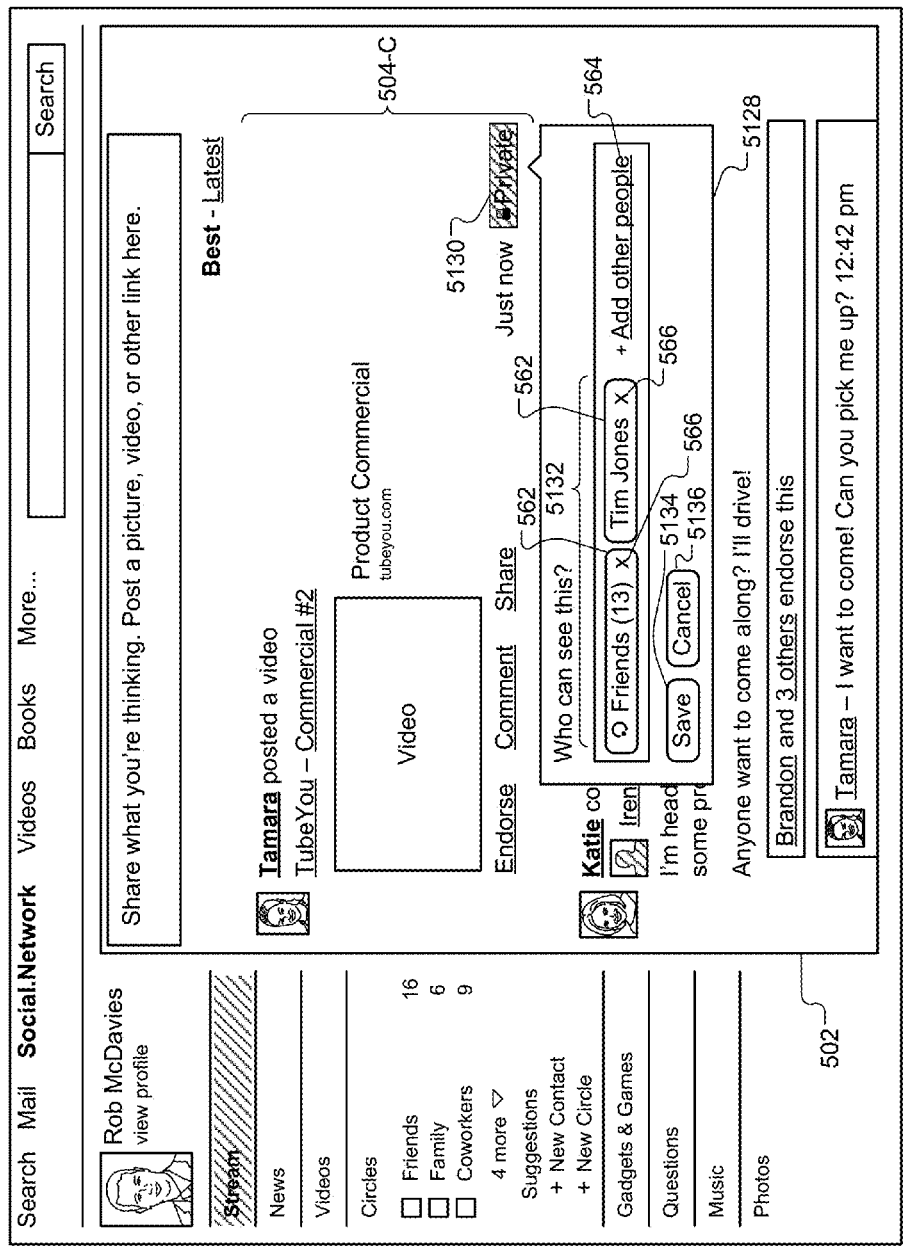

FIGS. 5A-5Q depict screen-shots of an example content stream page for a member of a social networking service, in accordance with some embodiments. FIG. 5A depicts a social networking page 500 associated with a user who is a member of the social networking service (e.g., "Rob McDavies," as depicted in FIG. 5A). The social networking page 500 includes an "all items" content stream 502. In some embodiments, the "all items" content stream 502 is displayed when the user selects a content stream selector 501 in the social networking page 500. Each of the selectors described herein is sometimes herein referred to as an affordance for accessing features of the social networking system. In general, the "all items" content stream 502 displays a content stream (also called a content (item) feed, content (item) sequence, or content item stream) of updates, posts, and other such information or content posted by substantially any contact in substantially any of the user's social circles and social network, and in some embodiments including content posted by the user himself.

The content stream 502 includes a number of posts 504-A thru 504-B. In some embodiments, the content stream 502 can include posts that are automatically selected based on the user's preferences and/or web history. For example, the post 504-B is a post that was selected and presented to the user based on the user's expressed interest in music videos. A banner 506 explains to the user why the post 504-B was presented to him, and an edit link 508 when selected presents an interface with which the user can interact to modify the criteria that are used to control the presentation of automatic posts.

A "latest" selector 510, when selected, causes the posts 504-A thru 504-B to be arranged chronologically (e.g., arranged by length of time elapsed since they were posted). A "best" selector 512, when selected, causes the posts 504-A thru 504-B to be arranged by quality. Optionally, when the best selector 512 is selected, the posts included in the user's content stream are also selected in accordance with predefined quality criteria, thereby excluding posts having low estimated relevance to the user. In some embodiments, the quality of posts is determined by the user's relationship to the author of the post, the reputation of the author, the number of other people who read, endorsed, commented on, or shared the post, how well the subject matter of the post aligns with the user's preferences or interests, or other appropriate criteria that can be used to estimate a post's relevance to the user. In some embodiments, a stream arranged according to the estimated relevancies of the posts it includes can be called a "perfect stream." The page 500 also includes a post input area 514. The user can click on the post input area 514, indicating intent to post something to the social network.

FIG. 5B depicts a screen-shot of the example "all items" content stream 502 showing a post region 550, which expands from the post input area 514 when the user selects (e.g., by clicking on) the post input area 514. The post region 550 includes an input box 552. A post into a text region 554 of the input box 552 is provided into which the user can enter text. A link selector 556, when selected, presents an interface that assists the user with entering a hyperlink to another web page (e.g., to share the page or comment on it). A photo selector 558, when selected, presents an interface that assists the user with adding one or more digital images to the post.

The post region 550 includes a sharing region 560. In some embodiments, the sharing region 560 provides an interface that lets the user determine the visibility of a post he is authoring, i.e., specify an ACL for the post. For example, the user may add or remove contacts, social circles, groups, or other distribution entities from the sharing region to specify an ACL for controlling who is allowed to see (or otherwise access) the post. In the illustrated example, a "Friends" icon 562-A and a "Family" icon 562-B appear in the sharing region 560 to indicate that the post is intended to be shared with only contacts that are members of the user's friends and/or family social circles; the ACL includes the "Friends" circle and the "Family" circle. In some embodiments, icons (e.g., icons 562) that represent distribution entities (e.g., social circles, a set of social circles, other groupings of contacts, individual contacts, etc.) may be referred to as "chips." An add link 564 (also herein called an affordance), when selected, presents an interface in which the user is able to select people and or circles to be added to the sharing region 560. Each of the icons 562-A and 562-B includes a remove button 566 that removes the corresponding icon from the sharing region, and the corresponding distribution entity from the ACL of the post, when the button 566 is activated. An icon 562 corresponding to a social circle or a set of social circles may include a count indicator 568 that displays the number of contacts in the corresponding circle or set of circles.

In some embodiments, when the user selects the post input area 514 to initiate a post, the sharing region 560 is initially populated with one or more icons 562. The icons 562 in the initial population are the icons 562 that were included in the ACL of the last post posted by the user. In some other embodiments, the sharing region 560 is initially empty (i.e., no icon 562) when the user selects the post input area 514.

A selector 570 provides the user with a way to indicate whether the post should be shared through email to contacts who are not members of the social networking service. For example, the user's family social circle may include contacts who have email addresses but who are not members of the social networking service (e.g., his grandmother receives email through a non-web capable cell phone, or through a fixed purpose email appliance that is incapable of giving her access to the social networking service). By toggling the selector 570, the user can choose whether or not the post should be sent by email to those nonmembers. An example of a post that the user may not wish to send by email can be a link to a video, since the user's aforementioned grandmother may not be able to view the video on her non-web capable equipment. A count indicator 572 displays the number of contacts who, from among the selections of distribution entities chosen by the user and displayed in the sharing region 560, are not members of the social networking service and would therefore receive an emailed version of the post if the user so chooses.

A post button 574, when selected, causes the newly authored post to be published to the social networking service and made accessible to only those contacts that are members of the distribution entities chosen by the user and displayed in the sharing region 560. A close button 576, when selected, cancels the authoring of a post and closes the post region 550.

FIG. 5C depicts a screen-shot of the example "all items" content stream 502 showing a cursor 578 displayed in the sharing region 560 when the user selects the add link 564 (FIG. 5B). The cursor 578 indicates that the user can add additional distribution entities to the sharing region 560, thus sharing the post with circles, contacts, etc. corresponding to those additional distribution entities. When the cursor 578 is displayed, the user can start typing in the name of a social circle, contact, etc. to whom he wishes to share the post. As the user types in a name, social circles, contacts, etc. that match the typed (complete or partial) name appear, as further described below with reference to FIG. 5D.

A sharing menu 580 is also displayed when the user selects the add link 564. The sharing menu 580 shows the authoring user's circles, groups, etc. that are selectable for inclusion in the sharing region 560 and not already in the sharing region 560. For example, the sharing menu 580 includes "My circles," which is a distribution entity that includes all of the authoring user's circles (except for a "Just following" circle). The sharing menu 580 also includes one or more social circles not already included in the sharing region 560 (e.g., "Book club," "Acquaintances," "Church"). As another example, the sharing menu 580 also includes the distribution entity "Anyone (public on the web)," which makes the post publicly accessible, and the distribution entity "Extended network," which makes the post accessible to first degree contacts of the user and second degree contacts of the user (e.g., contacts within the networks of the contacts in the user's network). As a further example, the sharing menu 580 includes recent combinations of distribution entities to whom the user has recently shared posts. For example, the user's most recent posts were shared with, in one instance, "My circles" and John Johnson, and in another instance, the "Friends" circle and the "Family" circle and John Smith. In some embodiments, the list of recent combinations is displayed as empty when the distribution entities in the list are all already in the sharing region 560. The user may select any of the distribution entities or combinations of distribution entities in the sharing menu 580 to add the selected distribution entity or combination to the sharing region 560.

FIG. 5D depicts a screen-shot of the example "all items" content stream 502 showing an icon 562-C corresponding to the "Church" circle included in the sharing region 560. When the user selects the "church" circle in the sharing menu 580 (see FIG. 5C), the "Church" circle icon 562-C is added to the sharing region 560, indicating that the post will be shared with the contacts in the "Church" circle, as well as the "Friends" and "Family" circles, as indicated by icons 562-A and 562-B in the sharing region 560. When the sharing menu 580 is displayed again, the "Church" circle option may be replaced by another one of the user's circles (not shown).

FIG. 5D also shows a letter "t" typed into the sharing region 560 by the user and displayed in proximity to the cursor 578. An autocomplete menu 582 is displayed in response to the typed letter "t." The autocomplete menu shows distribution entities (e.g., circles, groups, individuals, etc.) whose name starts with the typed letter "t." For example, the autocomplete menu 582 in FIG. 5D includes the distribution entities "Tennis club," "Tim Tam," and "Third-party service." The user may select any of the options in the autocomplete menu 582 to share the post with the selected distribution entity. The user may also continue typing letters into the sharing region 560 to refine the available distribution entities that are shown in the autocomplete menu 582. For example, if the user types a letter "e," so that the characters "te" is in the sharing region 560, the autocomplete menu 582 will then include the distribution entity "Tennis club" but not "Tim Tam" or "Third-party service" because, among these three entity, only "Tennis club" starts with the characters "te."

FIG. 5E shows an icon 562-D corresponding to the individual "Tim Tam" displayed in the sharing region 560 (e.g., in response to the user selection of "Tim Tam" from the autocomplete menu 582 (FIG. 5D)). FIG. 5E also shows that icon 562-B corresponding to the "Family" circle has been removed from the sharing region 560 (e.g., by the user selecting the remove button 566 in the icon 562-B). The "Family" circle is shown as an option in the sharing menu 580, and the user can select "Family" in the sharing menu 580 to re-add the social circle "Family" to the sharing region 560.

When the user is finished adding and/or removing distribution entities from the ACL, the user may select (e.g., click on) an area outside of the sharing region 560 to complete the adding and removing of icons 526 to/from the sharing region 560. FIG. 5F shows the sharing region 560 with the adding and removing of icons 526 completed. The sharing region includes "Friends" icon 526-A, "Church" icon 526-C, and "Tim Tam" icon 526-D. The post in the input box 552, when posted, will be visible to the "Friends" circle corresponding to the "Friends" icon 526-A, the "Church" circle corresponding to the "Church" icon 526-C, and the individual "Tim Tam" corresponding to the "Tim Tam" icon 526-D. If the user changes his mind regarding the ACL, the user may select the add link 564 before the post is posted to resume adding/removing icons 562 to/from the sharing region 560.

The selector 570, as described above, provides the user with a way to indicate whether the post should be shared through email to contacts who are not members of the social networking service. Optionally, selector 570 is accompanied by a change link 584. When the user selects the change link 584, the user may further refine the sharing of the post through email. For example, an email sharing dialog 586 (FIG. 5G) may be displayed to the user. The email sharing dialog 586 lists the distribution entities 588 in the ACL in accordance with the icons 562 in the sharing region 560. If a distribution entity 588 is a social circle (e.g., "Friends" 588-1 or "Church" 588-2), a set of social circles, or a group of contacts, a count 589 of contacts who are non-members of the social networking service out of a total number of contacts in the distribution entity is displayed. A link 590 is displayed; the user may select the link 590 to activate display of a roster of the non-member contacts in the corresponding distribution entity. A drop down menu 592 with emailing options is displayed. The user may select an emailing option from the drop down menu 592 to control which contacts in the corresponding distribution entity will be sent an email sharing the post (independently of sharing the post, through content streams, with contacts in the distribution entity who are members of the social networking service). In some embodiments, the emailing options include sending an email sharing the post to just the contacts in the distribution entity that are non-members (not subscribers) of the social networking service (e.g., "People not using Social Network"), sending an email sharing the post to everyone in the distribution entity (e.g., "Everyone in this circle"), and sending an email sharing the post to no one in the distribution entity (e.g., "No one in this circle").

In some embodiments, if the distributive entity is an individual (e.g., "Tim Tam" 588-3), a checkbox 594 is shown. The user checks the checkbox 594 to confirm "Tim Tam" as a recipient for the email sharing the post, or unchecks the checkbox 594 to remove "Tim Tam" as a recipient for the email.

When the user has completed selecting the emailing options and recipient choices, the user may select the submit button 596 to save the selections or select the cancel button 598 to discard any changes to the selections.

Returning to FIG. 5F, when the user has completed editing the post and adding/removing icons 562 from the sharing region 560 (i.e., completed editing the ACL), the user may select the post button (also herein called a post affordance) 574 to submit the post and the ACL to the social network server system 108. The social network server system 108 shares the post in accordance with the ACL and, if set, the emailing options 586 (FIG. 5G). In some embodiments, the post 504-D is added to the content stream 502 of the post author, as shown in FIG. 5H. The post 504-D also appears in the content streams of the contacts included in the distribution entities in the ACL. In some embodiments, however, one or more of the contacts in the distribution entities in the ACL may have established a filter that prevents a particular post from being included in the content streams presented to those contacts. In some embodiments, the posts that appear in a respective user's content stream are selected and/or ordered in accordance with multiple criteria. For example, as described above, when the best selector 512 is selected, the posts included in the user's content stream are also selected in accordance with predefined quality criteria, thereby excluding posts having low estimated relevance to the user. As noted above, the post may be emailed in accordance with a selected selector 570 (FIG. 5B) and the emailing options 586.

FIG. 5I-5O illustrate additional examples of distribution entities that may be included in an ACL for a post. Icons 562 corresponding to these distribution entities may be added or removed from the sharing region 560 in an analogous manner as the icons 562 described above with reference to FIGS. 5B-5F.

FIG. 5I shows a "My circles" icon 562-E and an "Extended network" icon 562-F displayed in the sharing region 560 of a post region 550 of an in-progress post. The "My circles" icon 562-E corresponds to all of the authoring user's circles and includes a count 568 of the contacts included in those circles. The "Extended network" icon 562-F corresponds to all of the authoring user's first and second degree contacts in the social networking service.

FIG. 5J shows an "Anyone (public on the web)" icon 562-G displayed in the sharing region 560 of a post region 550 of an in-progress post. The "Anyone (public on the web)" icon 562-E corresponds to all members of the social networking service; the post will be shared with everyone in the social networking service. In some embodiments, the "Anyone (public on the web)" icon 562-E also corresponds to, in addition to all members of the social networking service, non-members of the social networking service; non-members of the social networking service may access the post through a publicly accessible link or a publicly accessible content stream 502 that includes publicly accessible posts.

FIG. 5K shows a "San Jose, Calif." icon 562-H and a "UCLA" icon 562-I. The "San Jose, Calif." icon 562-H corresponds to contacts in the authoring user's network who lists San Jose, Calif. as an associated location in their respective profiles (e.g., as a hometown, as the current home location, etc.). The "UCLA" icon 562-I corresponds to contacts in the authoring user's network who lists UCLA as an associated institution (e.g., as a current or former student of that institution, as a current or former employee of that institution, etc.).

FIG. 5K also shows a letter "t" typed into the sharing region 560 by the user and displayed in proximity of the cursor 578. An autocomplete menu 582 is displayed in response to the typed letter "t." The autocomplete menu shows distribution entities (e.g., circles, groups, individuals, etc.) whose name starts with the typed letter "t," including "Third-party service." The "Third-party service" entity corresponds to a content feed (e.g., a content stream, a microblog) associated with the user at the third-party service, which is external to the social networking service provided by the social network server system 108. In some embodiments, the third-party service can be another social networking service or a microblogging service. In some embodiments, the social networking service may allow a user to share content to a content feed in any of multiple third-party services. In some embodiments, the social networking service communicates the shared content to a third party service through one or more application programming interfaces (APIs) corresponding to the third party service.

When the user selects the "Third-party service" entity, the user is prompted for authorization credentials for accessing a content feed (e.g., a content stream associated with the user's account) at the third party service. An example of a dialog box for entering the authorization credentials is illustrated in FIG. 5L. A credentials dialog box 5102 may include a username field 5104 and a password field 5106 for entering the username and password, respectively. The dialog box 5102 also includes a submit button 596 for submitting the entered username or password, and a cancel button 598 for cancelling out of the dialog box 5102. When the username and password is submitted, the social network server system 108 verifies the username and password with the third party service (e.g., through an API). When the username and password is verified, an icon 562-J corresponding to the third-party service is added to the sharing region 560, as shown in FIG. 5M.

In some embodiments, the social networking service is a service provided for members of an organization or domain external to the social network server system 108 (e.g., within a private corporate network) (hereinafter "domain" for convenience). A user within the domain may be a member of the social networking service and may have within his social network contacts within the domain and contacts outside the domain. FIG. 5N shows a "XYZ Company" icon 562-K and a "friends" icon 562-L displayed in the sharing region 560. The "XYZ Company" icon 562-K corresponds to the domain to which the user belongs and within which the user is using the domain-based social networking service. The "XYZ Company" icon 562-K includes everyone in the "XYZ Company" domain. In some embodiments, the user may add icons 562 corresponding to sub-groups within the "XYZ Company" domain to share content with a narrower set of contacts within the domain.

In some embodiments, the user within the "XYZ Company" domain may also share content with contacts outside of the domain. For example, the "Friends" icon 562-L corresponds to a "Friends" circle that includes contacts outside of the domain. In some embodiments, the "Friends" icon 562-L is differentiated from the "Friends" icon 562-A in a social networking service that is not domain-specific by different coloring of the icons (e.g., as represented by the vertical lines on the icon 562-L) or other visual indicia; the differentiated visual presentation of the icons alerts the user of the need to use caution when sharing content with contacts outside of the domain (for fear of exposing sensitive information).

In some embodiments, when a mouse pointer or the like hovers over an icon 562, an information pop-up is displayed. The pop-up displays information about the distribution entity corresponding to the hovered-over icon 562. For example, when a mouse pointer hovers over the "Friends" icon 562-L, a pop-up 5108 (FIG. 5O) is displayed. The pop-up 5108 includes information about the distribution entity corresponding to the icon 562-L, including the name 5109-A of the distribution entity, a count 5102-B of contacts in the entity (if, e.g., the entity is a social circle or a set of social circles), and a description 5103-C of the entity. In some embodiments, the pop-up includes a "View all" link 5111. When the "View all" link is selected, a roster of the contacts in the distribution entity is displayed. Optionally, the "View all" link 5111 is displayed only in pop-ups for distribution entities that are not individual contacts.

In some embodiments, when the social networking service is provided for a domain, the user is in the domain, and the distribution entity corresponding to the icon 562 includes non-member contacts, the pop-up includes a message 5110 alerting the user that the entity includes contacts outside of the domain. Additional example of entity information pop-ups are described below, with reference to FIG. 5P.

In some embodiments, when the user submits the post for posting, and the sharing region includes a distribution entity that includes one or more contacts outside of the domain, a posting confirmation dialog 5112 (FIG. 5O) is displayed. The dialog 5112 warns the user that content is being shared with contacts outside of the domain and asks the user to confirm or cancel the posting in light of the warning.

As described above, in some embodiments, when a mouse pointer or the like hovers over an icon 562, an information pop-up is displayed. The pop-up displays information about the distribution entity corresponding to the hovered-over icon 562. FIG. 5P illustrates additional examples of such information pop-ups. A pop-up 5114 may be displayed for an icon 562 corresponding to a social circle. The pop-up 5114 includes the name 5109-A, contact count 5109-B, a description 5109-C, and a "View all" link 5111. In some embodiments, the description 5109-C is an abbreviated list of the contacts or a subset of the contacts in the social circle (or more generally, the distribution entity).

In some embodiments, pop-ups 5116, 5118, and 5120 are displayed for icons 562 corresponding to the entities "Extended network," "My circles," and "Anyone (public on the web)," respectively. Each of these pop-ups 5116, 5118, and 5120 include a name 5109-A and a description 5109-C.

In some embodiments, pop-up 5122 is displayed when a mouse pointer hovers over an icon 562 corresponding to an individual contact who is a member of the social networking service. The pop-up 5122 includes information on the contact, such as circles in which the contact is a member, mutual contacts with the user, and status updates. The user may also access, from the pop-up 5122, one or more modalities for communicating with the user, such as chat, email, and voice.

In some embodiments, if the contact is not a member of the social networking service, pop-up 5124 or 5126 is displayed. Pop-up 5124 includes an email address of the contact. In some implementations, pop-up 5124 or 5126 includes a link 5125 which, when selected by a user, activates sending of an invitation to the contact to join the social networking service at the email address of the contact. In some implementations, if the contact's name is known, pop-up 5124 may be displayed. If the contact's name is not known, pop-up 5126 may be displayed instead.

FIG. 5Q depicts a screen-shot of the example "all items" content stream 502 showing a visibility preview 5128. In general, a visibility preview provides the user with information about which social circles and/or contacts are able to view or otherwise access a post. In the illustrated example, the user has published a post 504-C. By hovering, clicking, or otherwise selecting a privacy button 5130, the visibility preview 5128 is brought into view.

The visibility preview 5128 includes an access control list 5132 that displays icons 562 corresponding to the distribution entities that have permission to view the post 504-C. In some embodiments, the recipient list 5132 can initially include the distribution entities selected by the user in the sharing region 560 (for example, FIG. 5F). Similar to the sharing region 560, the user is able to add and remove a distribution entity by clicking the remove buttons 566 and the add link 564. A save button 5134, when selected, saves any changes made to the visibility of the post 504-C and closes the visibility preview 5128. A cancel button 5136, when selected, closes the visibility preview 5128 without saving changes.

In some embodiments, an icon 562 includes a graphic that visually indicates the type of distribution entity to which the icon corresponds. The graphic may be different for a personal circle, a shared circle, a domain, and different types of groups (e.g., "anyone," "extended network," "my circles").

Figure 6A:
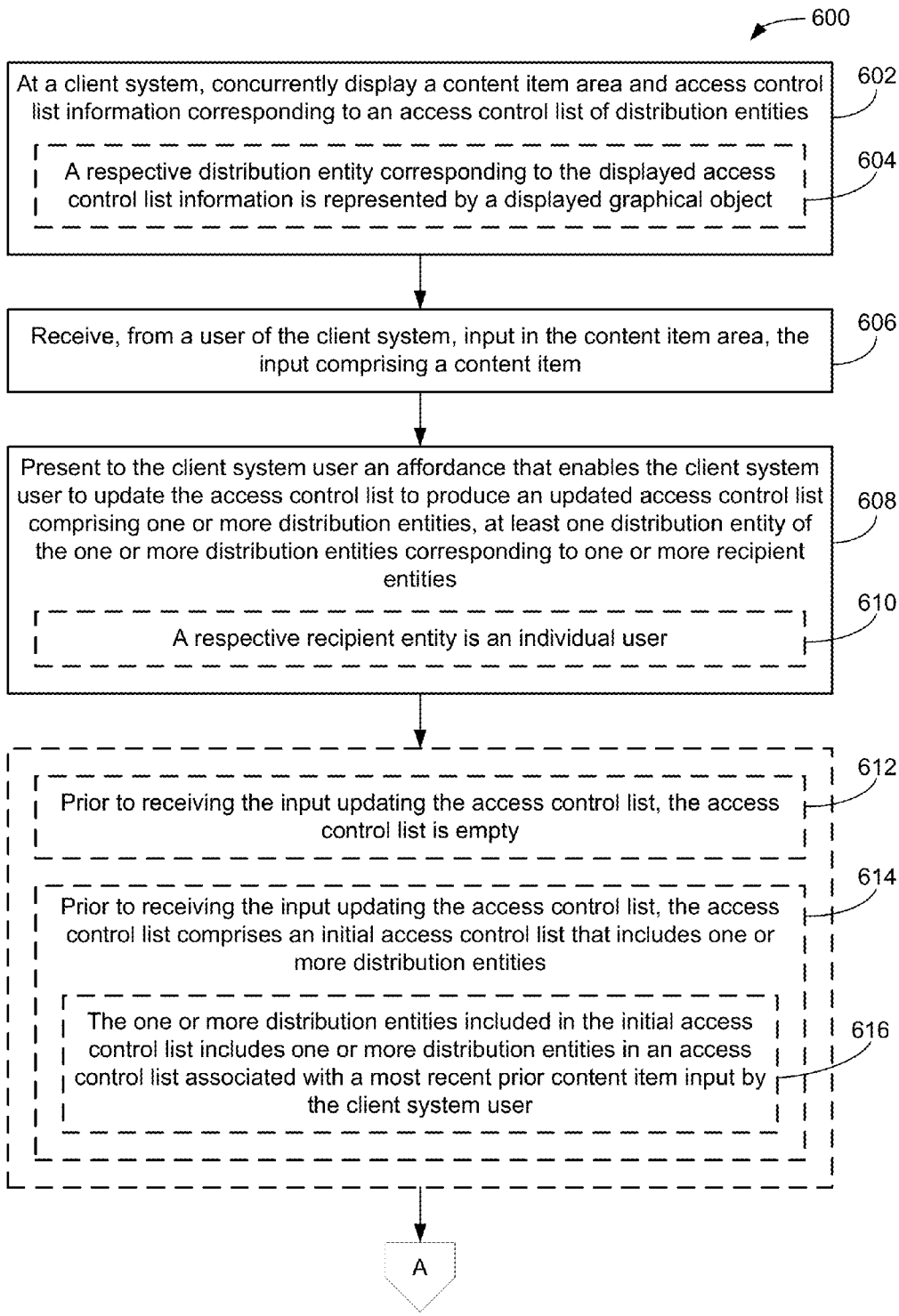
FIG. 6A-6C illustrates a flow diagram of a process for controlling access to content, in accordance with some embodiments.
Figure 6B:
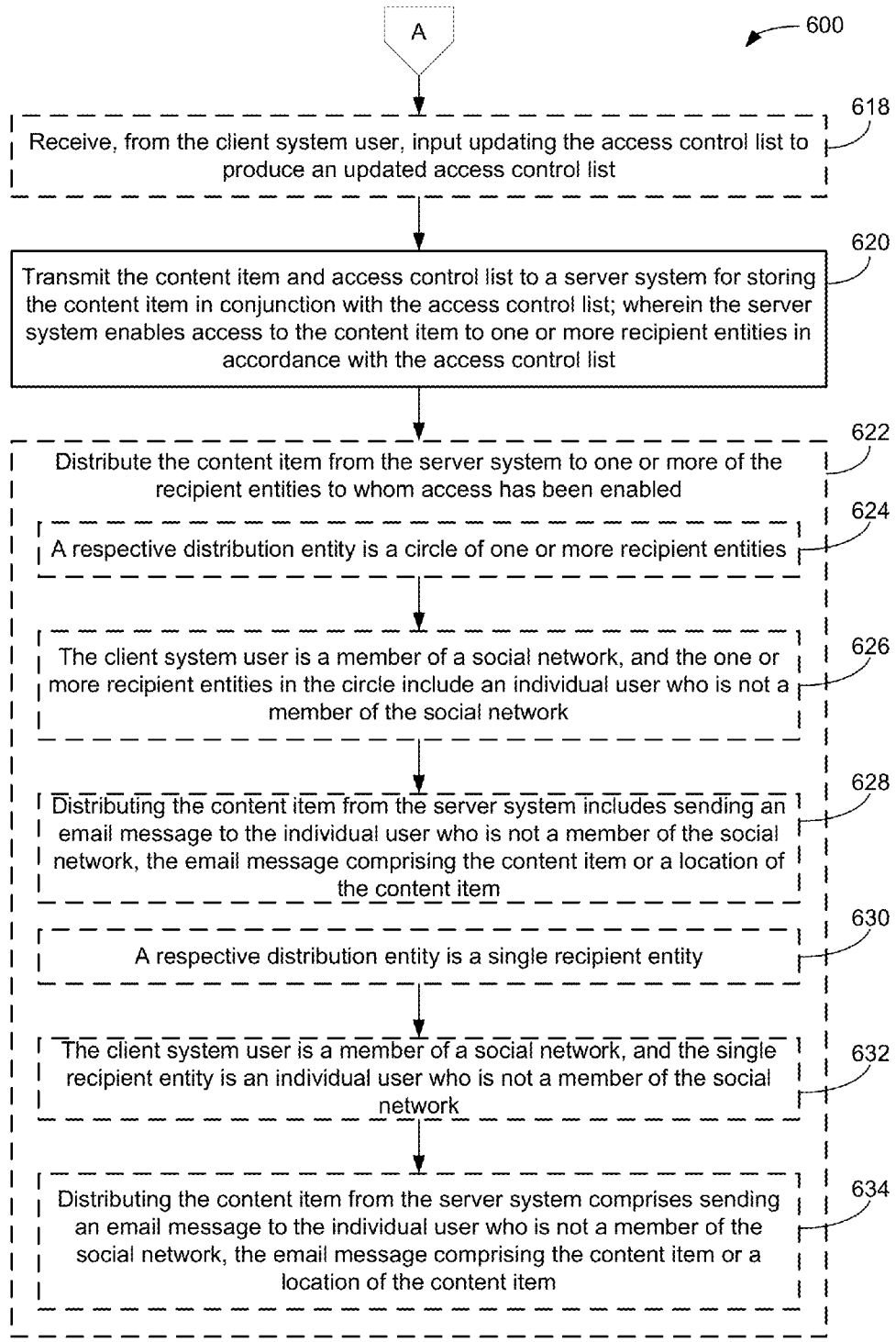
Figure 6C:
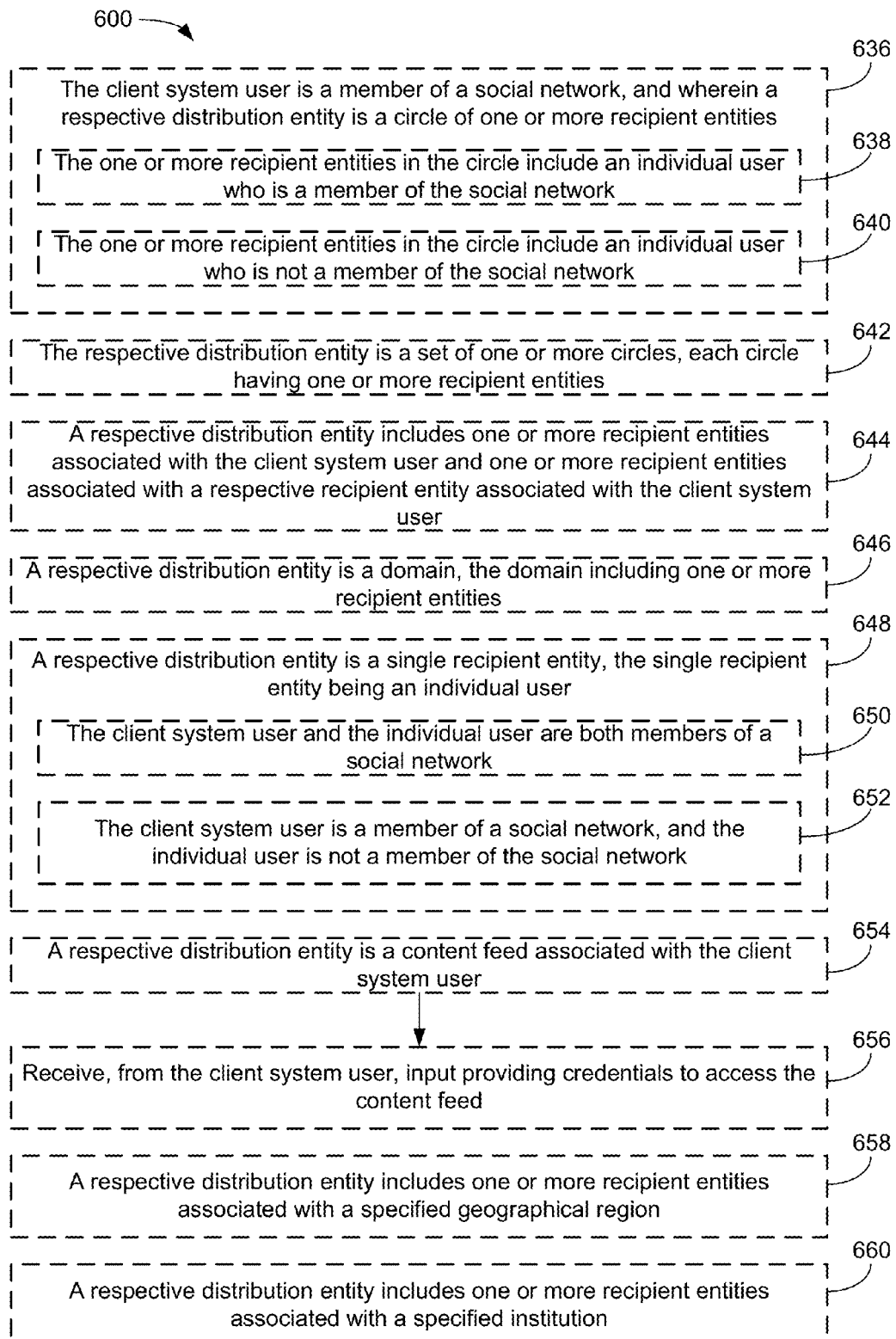

FIGS. 6A-6C illustrate a flow diagram of a process 600 for controlling access to content, in accordance with some embodiments. Each of the operations shown in FIGS. 6A-6C corresponds to instructions stored in a computer memory or non-transitory computer readable storage medium of a client system. Process 600 is performed by a client system (e.g., client system 104). Typically, however, the distribution of content in accordance with an access control list is performed by a server system remote from the client system.

A client system concurrently displays a content item area and access control list information corresponding to an access control list of distribution entities (602). A user, viewing a content stream 502 in a social networking page 500 (FIG. 5A), may select a post input area 514 in the page 500. When the post input area 514 is selected, a post region 550 is expanded and displayed (as in FIG. 5B). The post region 550 includes an input box 552 (the content item area) and a sharing region 560 where access control list information may be displayed. The access control list information includes icons 562 corresponding to distribution entities that make up an access control list for a post.

In some embodiments, a respective distribution entity corresponding to the displayed access control list information is represented by a displayed graphical object (604). A distribution entity in the access control list is represented by an icon 562 displayed in the sharing region 560.

The client system receives, from a user of the client system, input in the content item area, the input comprising a content item (606). The user may input a content item in the input box 552. The user may input, for example, a textual message (e.g., a status update), one or more photos, a link to external content (e.g., a web page), or embed a video from an external source (e.g., a video sharing site).

The client system presents to the client system user an affordance that enables the client system user to update the access control list to produce an updated access control list comprising one or more distribution entities, at least one distribution entity of the one or more distribution entities corresponding to one or more recipient entities (608). An add link 564 may be displayed in the sharing region 560. When the user selects the add link 564, the user may add and/or remove icons 562 to/from the sharing region 560 to produce an updated access control list.

A distribution entity, represented by an icon 562, may be a social circle, an individual, or a group, for example, and correspond to one or more recipient entities. In some embodiments, a respective recipient entity is an individual user (e.g., a contact) (610). Ultimately, a distribution entity corresponds to at least one individual contact; the contact may be the distribution entity (when the entity is the individual contact) or a member of a distribution entity (e.g., when the entity is a social circle or a group).

In some embodiments, the client system receives, from the client system user, input updating the access control list to produce an updated access control list (618) (FIG. 6B). The user may update the access control list by adding and/or removing icons 562 to/from the sharing region 560. As described above with reference to FIGS. 5C-5D, for example, the user may select a distribution entity from a sharing menu 580 or type in the name of a distribution entity and select a matching entity from an autocomplete menu 582.

In some embodiments, prior to receiving the input updating the access control list, the access control list is empty (612). The user populates the access control list by adding icons 562. In some other embodiments, prior to receiving the input updating the access control list, the access control list includes an initial access control list that includes one or more distribution entities (614) (represented by corresponding icons 562). In some embodiments, the one or more distribution entities included in the initial access control list includes one or more distribution entities in an access control list associated with a most recent prior content item input by the client system user (616). That is, the initial access control list is the same as the access control list for the last content post by the user.

The client system transmits the content item and access control list to a server system for storing the content item in conjunction with the access control list; the server system enables access to the content item to one or more recipient entities in accordance with the access control list (620). When the user submits the post with the content item (e.g., by selecting the post button 574), the post and the access control list are transmitted to a social network server system 108 and stored there (e.g., at a data store). The social network server system 108 makes the post available to one or more contacts in accordance with the access control list (e.g., in content streams, by email).

In some embodiments, the content item is distributed from the server system to one or more of the recipient entities to whom access has been enabled (622). The post is distributed to contacts in the distribution entities in the access control list for the post. For example, the post is shared with contacts in the distribution entities in respective content streams and/or by email.

In some embodiments, a respective distribution entity is a social circle having one or more recipient entities (624). In some circumstances, the client system user is a member of a social network, and the one or more recipient entities in the social circle include an individual user who is not a member of the social network (626). In some implementations, distributing the content item from the server system includes sending an email message to the individual user who is not a member of the social network, the email message including the content item or a location of the content item (628). As described above with reference to FIG. 2, a social circle may be a default or a user-created social circle, and a social circle may be populated by the user with one or more contacts regardless of whether it is a default social circle or user-created. A social circle may be added as a distribution entity to the access control list; a corresponding icon (e.g., 562-A, 562-B, or 562-C) is displayed in the sharing region 560. A social circle includes the user, who is a member of the social networking service, and one or more contacts, zero or more of which are not members of the social networking service. If a social contact in the social circle is not a member of the social networking service, the post may be shared with that contact by sending an email message including the post (or at least a link to the post) to that contact.

In some circumstances, a respective distribution entity is a single recipient entity (630), the client system user is a member of a social network, and the single recipient entity is an individual user who is not a member of the social network (632). In some implementations, distributing the content item from the server system comprises sending an email message to the individual user who is not a member of the social network, the email message comprising the content item or a location of the content item (634). An individual contact may be added as a distributive entity (e.g., icon 562-D, FIG. 5E) to the access control list. If the individual contact, unlike the user authoring the post, is not a member of the social networking service, the post may be shared with that contact by sending an email message including the post (or at least a link to the post) to that contact.

In some circumstances, the client system user is a member of a social network, and a respective distribution entity is a social circle of one or more recipient entities (636). As described above, the user authoring the post is a member of the social networking service and may have one or more associated social circles. A respective social circle may include one or more contacts and may be added as a distribution entity to the access control list.

In some circumstances, the one or more recipient entities in the social circle include an individual user who is a member of the social network (638). In some circumstances, the one or more recipient entities in the social circle include an individual user who is not a member of the social network (640). A contact in a social circle may be a member of the social networking service or not; a social circle may include members and non-members of the social networking service.

In some implementations, the respective distribution entity is a set of one or more social circles, each social circle having one or more recipient entities (642). A set of one or more social circles may be added as a distribution entity to the access control list as a shortcut to add multiple circles. For example, icon 562-E (FIG. 5I) corresponds to "My circles" which represents the user's circles except for a "Just following" circle. By adding icon 562-E to the sharing region 560, the post is shared with contacts in the user's social circles without the user having to add to the sharing region 560 an icon for each social circle individually.

In some embodiments, a respective distribution entity includes one or more recipient entities associated with the client system user and one or more recipient entities associated with a respective recipient entity associated with the client system user (644). For example, an "extended network" distribution entity (e.g., "Extended network" icon 562-F, FIG. 5I) may be added to the access control list. The "extended network" includes the user's first and second degree contacts in the social network.

In some embodiments, a respective distribution entity is a domain, the domain including one or more recipient entities (646). As described above, a social networking service may be provided for users in an organization or domain (e.g., a private corporate network). The domain (e.g., icon 562-K, FIG. 5N) may be added as a distributive entity to the access control list; the domain distributive entity includes users in the domain.

In some embodiments, a respective distribution entity is a single recipient entity, the single recipient entity being an individual user (648). An individual contact may be added as a distributive entity to the access control list. For example, "Tim Tam" icon 562-D (FIG. 5E) represents an individual contact.

In some circumstances, the client system user and the individual user are both members of a social network (650). In some other circumstances, the client system user is a member of a social network, and the individual user is not a member of the social network (652). An individual contact as a distributive entity may be a member of the social networking service, like the user authoring the post, or a non-member of the social networking service. Either type of contact may be a distributive entity in the access control list.

In some embodiments, a respective distribution entity is a content feed associated with the client system user (654). A content feed (e.g., a content stream in another social networking service, a microblog consisting of short textual messages, etc.) associated with the user and provided by a third-party service may be a distributive entity in the access control list. The post may be shared with the content feed (i.e., posted in the content feed) using one or more application programming interfaces (APIs) corresponding to the third party service. To get authorized access to the feed, the client system receives, from the client system user, input providing credentials to access the content feed (656). When the user adds a third-party service content feed to the access control list, the user is prompted for login credentials for the third-party service (e.g., credentials dialog box 5102, FIG. 5L). When the use submits the correct credentials, the third-party service is added as a distribution entity to the access control list.

In some embodiments, a respective distribution entity includes one or more recipient entities associated with a specified geographical region (658). A user may add a geographic region (e.g., a city) as a distributive entity (e.g., icon 562-H, FIG. 5K) to the access control list. The geographic region distributive entity may include contacts who listed in their respective profiles an association with the geographic region.

In some embodiments, a respective distribution entity includes one or more recipient entities associated with a specified institution (660). A user may add an institution (e.g., a university, a company, an organization) as a distributive entity (e.g., icon 562-I, FIG. 5K) to the access control list. The institution distributive entity may include contacts who listed in their respective profiles an affiliation (e.g., a current or former employee, a current or former student) with the institution.

For situations in which the systems discussed above collect information about users, the users may be provided with an opportunity to opt in/out of programs or features that may collect personal information (e.g., information about a user's preferences or a user's contributions to social content providers). In addition, in some examples, certain data may be anonymized in one or more ways before it is stored or used, so that personally identifiable information is removed. For example, a user's identity may be anonymized so that the personally identifiable information cannot be determined or associated for the user and so that identified user preferences or user interactions are generalized (for example, generalized based on user demographics) rather than associated with a particular user.

Although some of various drawings illustrate a number of logical stages in a particular order, stages which are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific embodiments. The embodiments were chosen and described in order to best explain the principles of the invention and its practical applications, to thereby enable others skilled in the art to best utilize the invention and various embodiments with various modifications as are suited to the particular uses contemplated. However, the illustrative discussions above are not intended to be exhaustive or to limit the claims to the precise forms disclosed. Many modifications and variations are possible in view of the above teachings.

What is claimed is:

1. A method comprising:
   in a social network application at a client system:
   displaying a plurality of posts associated with a user of the client system, wherein a first post in the plurality of posts is associated with a first recipient group associated with the user and a second post in the plurality of posts is associated with a second recipient group associated with the user, wherein the first recipient group is other than the second recipient group and wherein a respective post in the plurality of posts is automatically included in the plurality of posts based upon a category of the respective post matching a category associated with the user through the user's web history;
   displaying, while the plurality of posts is displayed, a content item area;
   receiving input in the content item area from the user, the input comprising a content item;
   presenting an affordance that enables the user to designate access control information corresponding to one or more distribution entities; and
   transmitting the content item and the access control information to a system, wherein access to the content item is restricted to distribution entities in accordance with the access control information.

2. The method of claim 1, wherein a respective distribution entity is an individual user.

3. The method of claim 1, further comprising:
   receiving, from the user, input updating the access control information to produce updated access control information;
   wherein prior to receiving the input updating the access control information, the access control information does not designate a distribution entity.

4. The method of claim 1, further comprising:
   receiving, from the user, input updating the access control information to produce updated access control information;
   wherein prior to receiving the input updating the access control information, the access control information includes one or more distribution entities.

5. The method of claim 4, wherein the one or more distribution entities included in the initial access control information include:

one or more distribution entities in an access control list associated with a most recent prior content item input by the user.

6. The method of claim 1, further including:
causing the content item to be distributed to one or more of the distribution entities to whom access has been enabled.

7. The method of claim 6, wherein:
a respective distribution entity in the access control information comprises a social network circle of one or more recipient entities,
the user is a member of a social network circle, the one or more recipient entities are in the social network circle, and the respective distribution entity further includes a first recipient entity who is not a member of the social network circle, and
causing the content item to be distributed comprises:
sending an email message to the first recipient entity who is not a member of the social network circle, the email message comprising the content item or a location of the content item.

8. The method of claim 1, wherein the user is a member of a social network circle, and wherein a respective distribution entity is a social network circle of one or more recipient entities.

9. The method of claim 1, wherein a respective distribution entity in the one or more distribution entities is a set of one or more social network circles, each social network circle having one or more recipient entities.

10. The method of claim 1, wherein a respective distribution entity in the one or more distribution entities includes one or more recipient entities associated with the user and one or more recipient entities associated with a respective recipient entity associated with the user.

11. The method of claim 1, wherein a respective distribution entity in the one or more distribution entities is a domain, the domain including one or more recipient entities.

12. The method of claim 1, wherein a respective distribution entity in the one or more distribution entities is a single recipient entity, the single recipient entity being an individual user.

13. The method of claim 12, wherein the user of the client system and the individual user are both members of the same social network.

14. The method of claim 12, wherein the user of the client system is a member of a social network circle, and wherein the individual user is not a member of the social network circle.

15. The method of claim 1, wherein
a respective distribution entity in the one or more distribution entities is a content feed associated with the user, and wherein the method further comprises
receiving, from the user, input providing credentials to access the content feed.

16. The method of claim 1, wherein a respective distribution entity in the one or more distribution entities includes one or more recipient entities associated with a specified geographical region.

17. The method of claim 1, wherein a respective distribution entity in the one or more distribution entities includes one or more recipient entities associated with a specified institution.

18. The method of claim 1, wherein the respective post is further selected based on a number of other people who have read, endorsed, commented on, or shared the respective post.

19. A client system, comprising:
one or more processors; and
memory storing one or more programs that when executed by the one or more processors cause the client system to:
in a social network application,
display a plurality of posts associated with a user of the client system, wherein a first post in the plurality of posts is associated with a first recipient group associated with the user and a second post in the plurality of posts is associated with a second recipient group associated with the user, wherein the first recipient group is other than the second recipient group and wherein a respective post in the plurality of posts is automatically included in the plurality of posts based upon a category of the respective post matching a category associated with the user through the user's web history;
display, while the plurality of posts is displayed, a content item area;
receive input in the content item area from the user, the input comprising a content item;
present an affordance that enables the user to designate access control information corresponding to one or more distribution entities; and
transmit the content item and the access control information to a system, wherein access to the content item is restricted to distribution entities in accordance with the access control information.

20. A non-transitory computer readable storage medium storing one or more programs that when executed by one or more processors of a client system cause the client system to:
in a social network application,
display a plurality of posts associated with a user of the client system, wherein a first post in the plurality of posts is associated with a first recipient group associated with the user and a second post in the plurality of posts is associated with a second recipient group associated with the user, wherein the first recipient group is other than the second recipient group and wherein a respective post in the plurality of posts is automatically included in the plurality of posts based upon a category of the respective post matching a category associated with the user through the user's web history;
display, while the plurality of posts is displayed, a content item area;
receive input in the content item area from the user, the input comprising a content item;
present an affordance that enables the user to designate access control information corresponding to one or more distribution entities; and
transmit the content item and the access control information to a system, wherein access to the content item is restricted to distribution entities in accordance with the access control information.

* * * * *